United States Patent
Liu et al.

(10) Patent No.: US 10,439,501 B2
(45) Date of Patent: Oct. 8, 2019

(54) RESONANT POWER CONVERTER AND FREQUENCY TRACKING METHOD FOR RESONANT POWER CONVERTER

(71) Applicant: Huawei Technologies Co., Ltd., Shenzhen (CN)

(72) Inventors: Ce Liu, Shenzhen (CN); Zhixian Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/172,082

(22) Filed: Oct. 26, 2018

(65) Prior Publication Data

US 2019/0068068 A1 Feb. 28, 2019

Related U.S. Application Data

(63) Continuation of application No. PCT/CN2017/073988, filed on Feb. 17, 2017.

(30) Foreign Application Priority Data

Apr. 29, 2016 (CN) .......................... 2016 1 0281631

(51) Int. Cl.
H02M 3/335 (2006.01)
H02M 1/08 (2006.01)
H02M 1/00 (2006.01)

(52) U.S. Cl.
CPC ......... H02M 3/33569 (2013.01); H02M 1/08 (2013.01); H02M 3/335 (2013.01);
(Continued)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 6,344,979 B1 2/2002 Huang et al.
2008/0024094 A1* 1/2008 Nishihara ........... H02M 3/3376
323/233

(Continued)

FOREIGN PATENT DOCUMENTS

CN 1368787 A 9/2002
CN 101499724 A 8/2009
(Continued)

OTHER PUBLICATIONS

Li et al., "On Automatic Resonant Frequency Tracking in LLC Series Resonant Converter Based on Zero-Current Duration Time of Secondary Diode," IEEE Transactions on Power Electronics, vol. 31, No. 7, pp. 4956-4962, Institute of Electrical and Electronics Engineers, New York, New York (Jul. 2016).

*Primary Examiner* — Yusef A Ahmed
*Assistant Examiner* — Bryan R Perez
(74) *Attorney, Agent, or Firm* — Leydig, Voit & Mayer, Ltd.

(57) ABSTRACT

A resonant power converter and a frequency tracking method for a resonant power converter are disclosed to determine a resonant status of the resonant power converter by sampling a secondary current, thereby controlling frequency of a drive signal. Therefore, the frequency of the drive signal tracks resonant frequency of the resonant power converter. The resonant power converter includes an inverter branch, which connected to the inverter branch, a transformer connected to the resonant branch, and a rectification and filtering branch connected to the transformer. A primary side of the transformer is connected to the resonant branch, and a secondary side of the transformer is connected to the rectification and filtering branch. A detection branch is connected to both the secondary side of the transformer and the rectification and filtering branch.

15 Claims, 24 Drawing Sheets

(52) U.S. Cl.
CPC .. *H02M 2001/0009* (2013.01); *Y02B 70/1433* (2013.01); *Y02B 70/1491* (2013.01)

(58) Field of Classification Search
CPC ......... H02M 3/33507; H02M 3/33592; H02M 3/33523; H02M 3/3353; H02M 3/33569; H02M 2001/0058; H02M 3/005; H02M 2003/1557; H02M 3/156; H02M 2007/4818; H02M 2007/4815; H02M 2007/4811; H02M 1/12; H02M 1/42; H02M 1/4225; H02M 1/4233; H02M 1/4241; H02M 1/4258; H02M 1/425; H02M 1/4208; Y02B 70/1425; Y02B 70/1491

See application file for complete search history.

(56) References Cited

U.S. PATENT DOCUMENTS

| | | | |
|---|---|---|---|
| 2008/0048575 A1* | 2/2008 | Muramatsu | H05B 41/2882 315/209 M |
| 2016/0190945 A1 | 6/2016 | Liu et al. | |

FOREIGN PATENT DOCUMENTS

| | | |
|---|---|---|
| CN | 202231500 U | 5/2012 |
| CN | 104426376 A | 3/2015 |
| CN | 104467443 A | 3/2015 |
| CN | 104539165 A | 4/2015 |
| CN | 104638895 A | 5/2015 |
| CN | 104811055 A | 7/2015 |
| CN | 104935090 A | 9/2015 |
| CN | 105226984 A | 1/2016 |
| JP | 2015077007 A | 4/2015 |

* cited by examiner

RESONANT POWER CONVERTER AND FREQUENCY TRACKING METHOD FOR RESONANT POWER CONVERTER

CROSS-REFERENCE TO RELATED APPLICATIONS

This application is a continuation of International Application No. PCT/CN2017/073988, filed on Feb. 17, 2017, which claims priority to Chinese Patent Application No. 201610281631.4, filed on Apr. 29, 2016. The disclosures of the aforementioned applications are hereby incorporated by reference in their entireties.

TECHNICAL FIELD

Embodiments of the present application relate to the communications field, and in particular, to a resonant power converter and a frequency tracking method for a resonant power converter.

BACKGROUND

A resonant power converter is a power-electronics conversion apparatus based on a soft switching technology. With emergence of a high-frequency switch component, the resonant power converter develops towards high frequency, integration, and modularization. Soft switching is a switching process using the soft switching technology. In an ideal soft switching process, a current or voltage is first decreased to zero, and then the current or voltage is gradually increased to a rated value, so that a switching loss is approximately zero. Therefore, the power converter can have high frequency. Common soft switching includes: ZVS (zero-voltage switching), ZCS (zero-current switching), ZCT (zero-current transition), ZCT (zero-voltage transition), and the like.

An LLC resonant circuit (that is, including two inductors L and one capacitor C) is a common high-efficiency DC (direct current)/DC converter structure. To improve efficiency of an LLC resonant power converter, the LLC resonant power converter usually needs to be controlled to work in a soft switching status, so as to reduce a switching loss, thereby improving power density of the LLC resonant power converter. A direct current characteristic curve of the LLC resonant power converter is shown in FIG. 1, and Q in FIG. 1 is a quality factor of the LLC resonant power converter. The LLC resonant power converter may work at a resonant frequency point, in a ZVS area, or in a ZCS area. The LLC resonant power converter has best efficiency when working at the resonant frequency point. However, during actual working, the LLC resonant power converter may work in different areas because of a change in a parameter such as load or a voltage. To ensure security of the LLC resonant power converter, in all load ranges, the LLC resonant power converter needs to work at the resonant frequency point or in a first area in FIG. 1, and usually does not work in a second area, and cannot work in a third area. This is because if the LLC resonant power converter works in the second area, the LLC resonant power converter may enter the third area from the second area when the load increases, and monotonousness of a voltage gain changes (that is, originally, under specific load, the voltage gain decreases as frequency increases, and after the LLC resonant power converter enters the third area, under specific load, the voltage gain increases as frequency increases). Consequently, there is a breakdown risk. Therefore, the LLC resonant power converter needs to determine, by determining a resonant status of the LLC resonant power converter, whether the LLC resonant power converter works at the resonant frequency point, in the first area, in the second area, or in the third area, so as to adjust switching frequency of a switching transistor in the resonant power converter according to the resonant status.

Most existing resonant power converters determine resonant statuses of the resonant power converters according to a phase difference between a primary current that enters a resonant network and a square wave voltage applied to the resonant network. However, because a resonant power converter that performs sampling based on a secondary current cannot obtain the primary current of the resonant network, the resonant power converter that performs sampling based on a secondary current cannot determine a resonant status of the resonant power converter in an existing manner.

SUMMARY

Embodiments of the present application provide a resonant power converter and a frequency tracking method for a resonant power converter, to determine a resonant status of the resonant power converter by sampling a secondary current, thereby controlling frequency of a drive signal. Therefore, the frequency of the drive signal tracks resonant frequency of the resonant power converter.

To achieve the foregoing objective, the following technical solutions are used in the embodiments of the present application.

According to a first aspect, an embodiment of the present application provides a resonant power converter. The resonant power converter includes: an inverter branch, a resonant branch connected to the inverter branch, a transformer connected to the resonant branch, and a rectification and filtering branch connected to the transformer. A primary side of the transformer is connected to the resonant branch, and a secondary side of the transformer is connected to the rectification and filtering branch. In addition, the resonant power converter further includes: a detection branch connected to both the secondary side of the transformer and the rectification and filtering branch, a determining branch connected to the detection branch, and a control branch connected to both the determining branch and the inverter branch.

The detection branch is configured to: obtain a secondary current of the transformer, generate, according to the secondary current, a pulse signal corresponding to the secondary current, and send the pulse signal corresponding to the secondary current to the determining branch.

The control branch is configured to generate a drive signal and send the drive signal to the inverter branch and the determining branch. The drive signal is used to drive the inverter branch.

The determining branch is configured to: receive the pulse signal that is corresponding to the secondary current and sent by the detection branch and the drive signal sent by the control branch, and generate first information and send the first information to the control branch according to the pulse signal corresponding to the secondary current and the drive signal. The first information is used to indicate a resonant status of the resonant power converter.

The control branch is further configured to: receive the first information sent by the determining branch, and control frequency of the drive signal according to the first information.

In the resonant power converter provided in this embodiment of the present application, the determining branch can receive the pulse signal that is corresponding to the secondary current and sent by the detection branch, and generate, according to the pulse signal corresponding to the secondary current and the drive signal, the first information that is used to indicate the resonant status of the resonant power converter, so that the control branch controls the frequency of the drive signal according to the first information. Therefore, the resonant status of the resonant power converter is determined by sampling the secondary current, and the frequency of the drive signal is controlled to track the resonant frequency of the resonant power converter.

Optionally, the resonant power converter further includes:

a sampling circuit that is connected to each of the detection branch, the secondary side of the transformer, and the rectification and filtering branch and that is configured to sample the secondary current.

Optionally, the sampling circuit is specifically configured to sample the secondary current by using a hall effect, or sample the secondary current by sampling a voltage between two ends of a diode in the rectification and filtering branch.

Optionally, the sampling circuit specifically includes: a comparator, a first resistor, a second resistor, a third resistor, and a capacitor, where an output end of the comparator is connected to one end of the third resistor, one end of the capacitor is connected to the other end of the third resistor, the other end of the third resistor is connected to the detection branch, a positive input end of the comparator is connected to one end of the first resistor, a negative input end of the comparator is connected to one end of the second resistor, the other end of the first resistor is connected to both the transformer and the rectification and filtering branch, and the other end of the second resistor and the other end of the capacitor are grounded.

Optionally, the sampling circuit specifically includes: a comparator, a first resistor, a second resistor, a third resistor, a fourth resistor, a fifth resistor, and a sixth resistor, where an output end of the comparator is connected to the detection branch, a negative input end of the comparator is connected to one end of the first resistor, the other end of the first resistor is connected to one end of the second resistor, the other end of the second resistor is connected to both the transformer and the rectification and filtering branch, one end of the third resistor is connected to the output end of the comparator, the other end of the third resistor is connected to the negative input end of the comparator, a positive input end of the comparator is connected to one end of the fourth resistor, the other end of the fourth resistor is connected to one end of the fifth resistor, the other end of the fifth resistor is connected to the rectification and filtering branch, the positive input end of the comparator is connected to one end of the sixth resistor, and the other end of the sixth resistor is grounded.

Optionally, the inverter branch is of any one of a half-bridge inverter circuit structure, a full-bridge inverter circuit structure, or a three-level inverter circuit structure;

the resonant branch is of an LLC resonant circuit structure that is formed by connecting an excitation inductor, a resonant inductor, and a resonant capacitor in series; and the rectification and filtering branch is of a half-wave rectification and filtering circuit structure or a full-wave rectification and filtering circuit structure.

According to a second aspect, an embodiment of the present application provides a frequency tracking method for a resonant power converter, applied to the resonant power converter according to any implementation of the first aspect. The frequency tracking method for a resonant power converter includes:

First, the resonant power converter obtains a pulse signal corresponding to a secondary current and a drive signal; then, the resonant power converter generates, according to the pulse signal corresponding to the secondary current and the drive signal, first information used to indicate a resonant status of the resonant power converter; and at last, the resonant power converter controls frequency of the drive signal according to the first information.

In the frequency tracking method for a resonant power converter provided in this embodiment of the present application, the resonant power converter can generate, according to the pulse signal corresponding to the secondary current and the drive signal, the first information used to indicate the resonant status of the resonant power converter, to control the frequency of the drive signal according to the first information. Therefore, the resonant status of the resonant power converter is determined by sampling the secondary current, and the frequency of the drive signal is controlled to track the resonant frequency of the resonant power converter.

Optionally, a method for obtaining the pulse signal corresponding to the secondary current by the resonant power converter includes:

the resonant power converter first obtains the secondary current, and then generates, according to the secondary current, the pulse signal corresponding to the secondary current.

Optionally, a method for generating the first information by the resonant power converter according to the pulse signal corresponding to the secondary current and the drive signal includes:

the resonant power converter determines that a rising edge of the pulse signal corresponding to the secondary current and a rising edge of the drive signal are synchronous and that a falling edge of the pulse signal corresponding to the secondary current and a falling edge of the drive signal are synchronous, and generates the first information, where the first information is used to indicate that the resonant power converter works at a resonant frequency point.

A method for controlling the frequency of the drive signal by the resonant power converter according to the first information includes:

the resonant power converter keeps the frequency of the drive signal unchanged according to the first information.

In the frequency tracking method for a resonant power converter provided in this embodiment of the present application, if the rising edge of the pulse signal corresponding to the secondary current and the rising edge of the drive signal are synchronous, and the falling edge of the pulse signal corresponding to the secondary current and the falling edge of the drive signal are synchronous, it indicates that the resonant power converter works at the resonant frequency point. In this case, the frequency of the drive signal does not need to be adjusted, and it only requires to keep the frequency of the drive signal unchanged.

Optionally, a method for generating the first information by the resonant power converter according to the pulse signal corresponding to the secondary current and the drive signal includes:

the resonant power converter determines that a rising edge of the pulse signal corresponding to the secondary current and a rising edge of the drive signal are synchronous and that a falling edge of the pulse signal corresponding to the secondary current lags behind a falling edge of the drive signal, and generates the first information, where the first information is used to indicate that the resonant power converter works in a first area.

A method for controlling the frequency of the drive signal by the resonant power converter according to the first information includes:

the resonant power converter decreases the frequency of the drive signal according to the first information.

In the frequency tracking method for a resonant power converter provided in this embodiment of the present application, if the rising edge of the pulse signal corresponding to the secondary current and the rising edge of the drive signal are synchronous, and the falling edge of the pulse signal corresponding to the secondary current lags behind the falling edge of the drive signal, it indicates that the resonant power converter works in the first area. In this case, the frequency of the drive signal needs to be decreased, so that the resonant power converter works at the resonant frequency point.

Optionally, a method for generating the first information by the resonant power converter according to the pulse signal corresponding to the secondary current and the drive signal includes:

the resonant power converter determines that a rising edge of the pulse signal corresponding to the secondary current and a rising edge of the drive signal are synchronous and that a falling edge of the pulse signal corresponding to the secondary current leads a falling edge of the drive signal, and generates the first information, where the first information is used to indicate that the resonant power converter works in a second area.

A method for controlling the frequency of the drive signal by the resonant power converter according to the first information includes:

the resonant power converter increases the frequency of the drive signal according to the first information.

In the frequency tracking method for a resonant power converter provided in this embodiment of the present application, if the rising edge of the pulse signal corresponding to the secondary current and the rising edge of the drive signal are synchronous, and the falling edge of the pulse signal corresponding to the secondary current leads the falling edge of the drive signal, it indicates that the resonant power converter works in the second area. In this case, the frequency of the drive signal needs to be increased, so that the resonant power converter works at the resonant frequency point.

Optionally, a method for generating the first information by the resonant power converter according to the pulse signal corresponding to the secondary current and the drive signal includes:

the resonant power converter determines that a rising edge of the pulse signal corresponding to the secondary current leads a rising edge of the drive signal and that a falling edge of the pulse signal corresponding to the secondary current leads a falling edge of the drive signal, and generates the first information, where the first information is used to indicate that the resonant power converter works in a third area.

A method for controlling the frequency of the drive signal by the resonant power converter according to the first information includes:

the resonant power converter first stops, according to the first information, generating the drive signal, and then resumes the generation of the drive signal after increasing the frequency of the drive signal.

In the frequency tracking method for a resonant power converter provided in this embodiment of the present application, if the rising edge of the pulse signal corresponding to the secondary current leads the rising edge of the drive signal, and the falling edge of the pulse signal corresponding to the secondary current leads the falling edge of the drive signal, it indicates that the resonant power converter works in the third area. In this case, to avoid breakdown, generation of the drive signal needs to be stopped first, and after a control branch of the resonant power converter increases the frequency of the drive signal, the control branch of the resonant power converter resumes the generation of the drive signal and sends the drive signal to an inverter branch of the resonant power converter. Then, it is determined whether the resonant power converter still works in the third area, and if the resonant power converter still works in the third area, the generation of the drive signal is stopped again, and the frequency of the drive signal is further increased, so that the resonant power converter finally works at the resonant frequency point.

The embodiments of the present application provide the resonant power converter and the frequency tracking method for a resonant power converter. The resonant power converter includes: the inverter branch, the resonant branch connected to the inverter branch, the transformer connected to the resonant branch, and the rectification and filtering branch connected to the transformer, where the primary side of the transformer is connected to the resonant branch, and the secondary side of the transformer is connected to the rectification and filtering branch; the detection branch connected to both the secondary side of the transformer and the rectification and filtering branch; the determining branch connected to the detection branch; and the control branch connected to both the determining branch and the inverter branch. The detection branch is configured to: obtain the secondary current of the transformer, generate, according to the secondary current, the pulse signal corresponding to the secondary current, and send the pulse signal corresponding to the secondary current to the determining branch. The control branch is configured to generate the drive signal and send the drive signal to the inverter branch and the determining branch. The drive signal is used to drive the inverter branch. The determining branch is configured to: receive the pulse signal that is corresponding to the secondary current and sent by the detection branch and the drive signal sent by the control branch, and generate the first information and send the first information to the control branch according to the pulse signal corresponding to the secondary current and the drive signal. The first information is used to indicate the resonant status of the resonant power converter. The control branch is further configured to: receive the first information sent by the determining branch, and control the frequency of the drive signal according to the first information. Based on the foregoing descriptions, the determining branch can receive the pulse signal that is corresponding to the secondary current and sent by the detection branch, and generate, according to the pulse signal corresponding to the secondary current and the drive signal, the first information that is used to indicate the resonant status of the resonant power converter, so that the control branch controls the frequency of the drive signal according to the first information. Therefore, the resonant status of the resonant power converter is determined by sampling the secondary current, and the frequency of the drive signal is controlled to track the resonant frequency of the resonant power converter.

DESCRIPTION OF EMBODIMENTS

A technology described in embodiments of the present application is mainly applied to an LLC resonant power converter. The LLC resonant power converter provided in the embodiments of the present application is a control circuit with an open loop structure. The open loop structure is a structure in which a control result is not fed back to affect current control.

Figure 1:
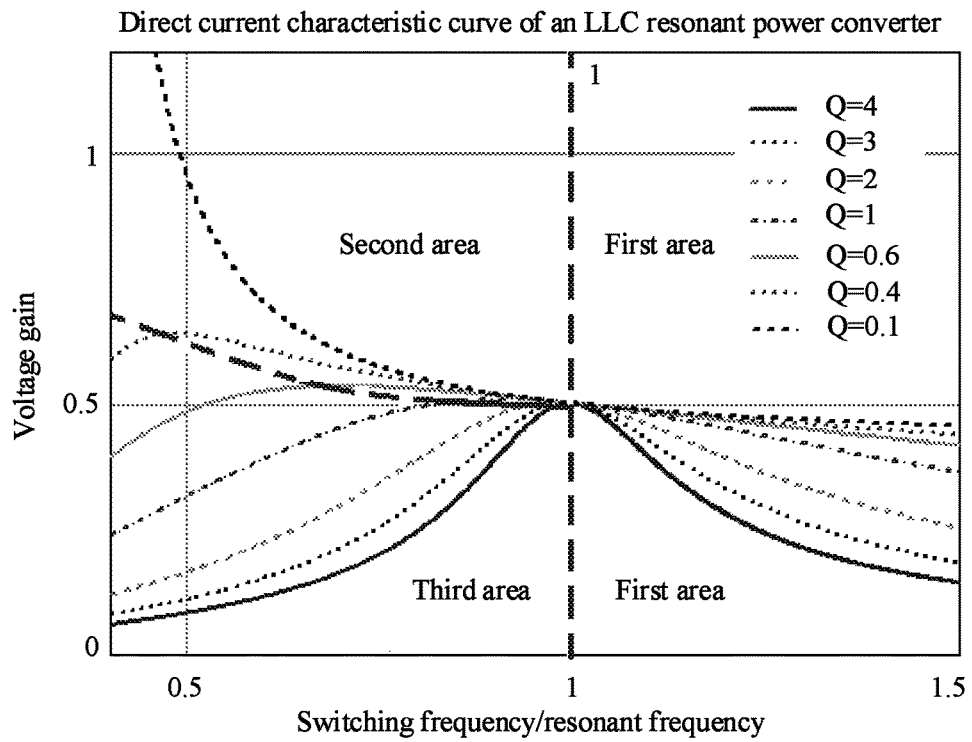
FIG. 1 shows a direct current characteristic curve of an existing LLC resonant power converter.
Figure 2:
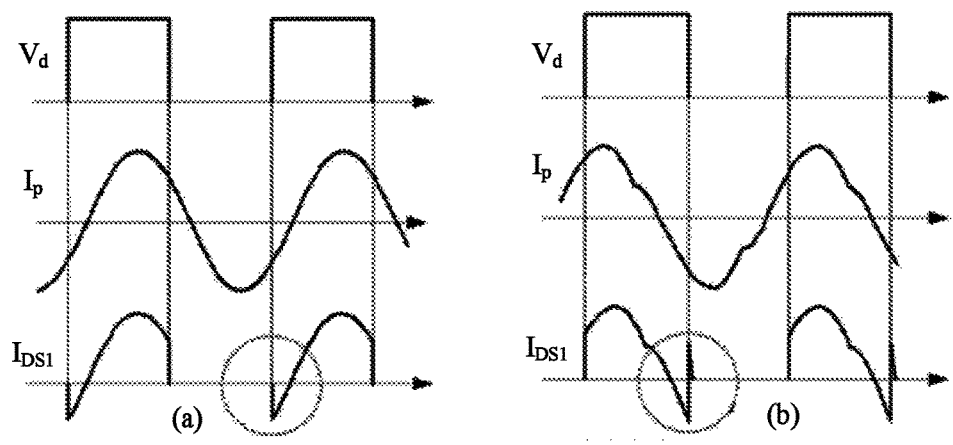
FIG. 2 is waveform diagrams when an existing LLC resonant power converter works in an inductive mode and a capacitive mode.

To determine whether the LLC resonant power converter works at a resonant frequency point in FIG. 1 or works in a first area, a second area, or a third area in FIG. 1, in the prior art, an inductive mode or a capacitive mode is determined by detecting a phase difference between a primary current Ip that enters a resonant network and a square wave voltage Vd applied to a resonant circuit. In the capacitive mode, the primary current Ip leads the square wave voltage Vd, and in the inductive mode, the primary current Ip lags behind the square wave voltage Vd. (a) in FIG. 2 and (b) in FIG. 2 are respectively waveform diagrams when the LLC resonant power converter works in the inductive mode and the capacitive mode. As shown in (a) in FIG. 2, the primary current Ip lags behind the square wave voltage Vd, and the LLC resonant power converter works in the inductive mode. As shown in (b) in FIG. 2, the primary current Ip leads the square wave voltage Vd, and the LLC resonant power converter works in the capacitive mode. The LLC resonant power converter adjusts switching frequency of a switching transistor in the resonant power converter according to a working mode of the LLC resonant power converter. That is, when the LLC resonant power converter works in the inductive mode, the switching frequency of the switching transistor in the resonant power converter needs to be decreased, and when the LLC resonant power converter works in the capacitive mode, the switching frequency of the switching transistor in the resonant power converter needs to be increased. However, an LLC resonant power converter that performs sampling based on a secondary current cannot obtain the primary current Ip. Therefore, a resonant status of the LLC resonant power converter cannot be determined in an existing manner. The resonant power converter provided in the embodiments of the present application can determine the resonant status of the resonant power converter by sampling the secondary current, and control frequency of a drive signal, so that the frequency of the drive signal tracks resonant frequency of the resonant power converter.

It should be noted that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 3:
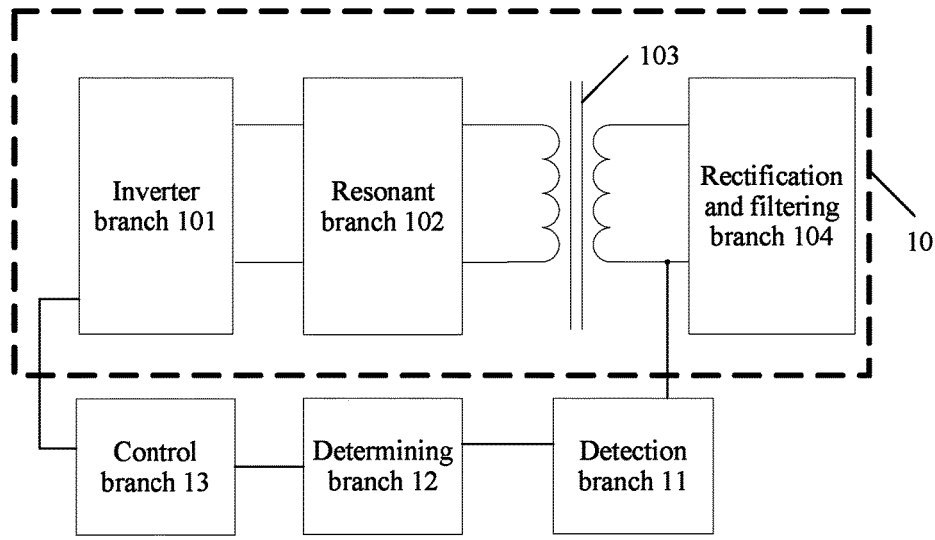
FIG. 3 is a first schematic structural diagram of a resonant power converter according to an embodiment of the present application.

An embodiment of the present application provides a resonant power converter. As shown in FIG. 3, the resonant power converter includes: an inverter branch 101, a resonant branch 102 connected to the inverter branch 101, a transformer 103 connected to the resonant branch 102, and a rectification and filtering branch 104 connected to the transformer 103. A primary side of the transformer 103 is connected to the resonant branch 102, and a secondary side of the transformer 103 is connected to the rectification and filtering branch 104. A circuit that includes the inverter branch 101, the resonant branch 102, the transformer 103, and the rectification and filtering branch 104 may be referred to as a primary power circuit 10 (a part indicated by a dashed block in FIG. 3). The resonant power converter further includes: a detection branch 11 connected to both the secondary side of the transformer 103 and the rectification and filtering branch 104, a determining branch 12 connected to the detection branch 11, and a control branch 13 connected to both the determining branch 12 and the inverter branch 101.

The detection branch 11 is configured to: obtain a secondary current of the transformer 103, generate, according to the secondary current, a pulse signal corresponding to the secondary current, and send the pulse signal corresponding to the secondary current to the determining branch 12.

The control branch 13 is configured to generate a drive signal and send the drive signal to the inverter branch 101 and the determining branch 12. The drive signal is used to drive the inverter branch 101.

The determining branch 12 is configured to: receive the pulse signal that is corresponding to the secondary current and sent by the detection branch 11 and the drive signal sent by the control branch 13, and generate first information and send the first information to the control branch 13 according to the pulse signal corresponding to the secondary current and the drive signal. The first information is used to indicate a resonant status of the resonant power converter.

The control branch 13 is further configured to: receive the first information sent by the determining branch 12, and control frequency of the drive signal according to the first information.

It should be noted that in a process in which the determining branch 12 generates the first information according to the pulse signal corresponding to the secondary current and the drive signal, the pulse signal corresponding to the secondary current and the drive signal may be signals that are not in a same switching period. For example, the drive signal that is sent by the control branch 13 and obtained by the determining branch 12 may be a drive signal in a last switching period or a drive signal in one or more former switching periods. This is not limited in this embodiment of the present application.

It should be further noted that the drive signal mentioned in this embodiment of the present application is a signal used to drive a switching transistor in the inverter branch 101. Therefore, switching frequency of the switching transistor in the inverter branch 101 is equal to the frequency of the drive signal.

Figure 4:
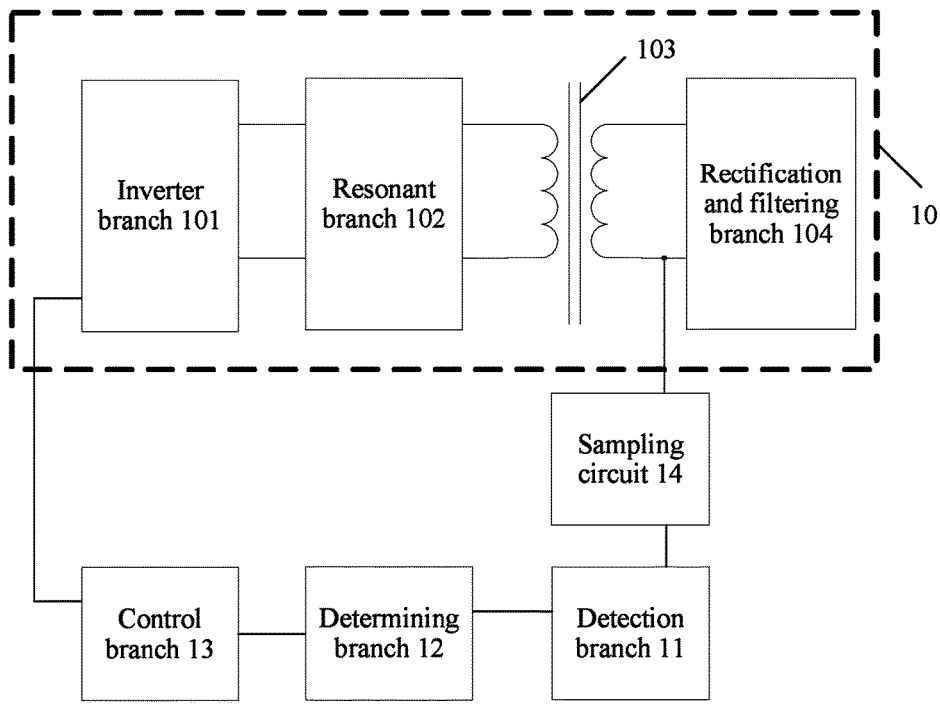
FIG. 4 is a second schematic structural diagram of a resonant power converter according to an embodiment of the present application.

As shown in FIG. 4, the resonant power converter further includes:

a sampling circuit 14 that is connected to each of the detection branch 11, the secondary side of the transformer 103, and the rectification and filtering branch 104 and that is configured to sample the secondary current.

It should be noted that the sampling circuit 14 usually samples the secondary current by using two methods. In one method, the secondary current is sampled by using a hall effect. The hall effect is a phenomenon that when a current perpendicular to an external magnetic field passes through a conductor, a carrier deviates, and an additional electric field is generated in a direction perpendicular to the current and the magnetic field, and therefore an electric potential difference is generated between two ends of the conductor. In the other manner, the secondary current is sampled by sampling a voltage between two ends of a diode in the rectification and filtering branch 104. Due to unilateral electrical conductivity of the diode, when a current passes through the diode, a forward conduction voltage drop is only a few tenths volt, for example, a common silicon diode is approximately 0.7 V. When the diode is disconnected, the diode bears a reverse voltage, and when the secondary current is sampled by sampling the voltage between the two ends of the diode in the rectification and filtering branch 104, only positive or negative of the voltage of the diode needs to be determined. That is, when the voltage of the diode is positive, a high level is output, and when the voltage of the diode is negative, a low level is output.

Specifically, the inverter branch 101 is of any one of a half-bridge inverter circuit structure, a full-bridge inverter circuit structure, or a three-level inverter circuit structure.

The resonant branch 102 is of an LLC resonant circuit structure. The LLC resonant circuit structure is formed by sequentially connecting an excitation inductor Lm, a resonant inductor Lr, and a resonant capacitor Cr in series.

The rectification and filtering branch 104 is of a half-wave rectification and filtering circuit structure or a full-wave rectification and filtering circuit structure.

Figure 5:
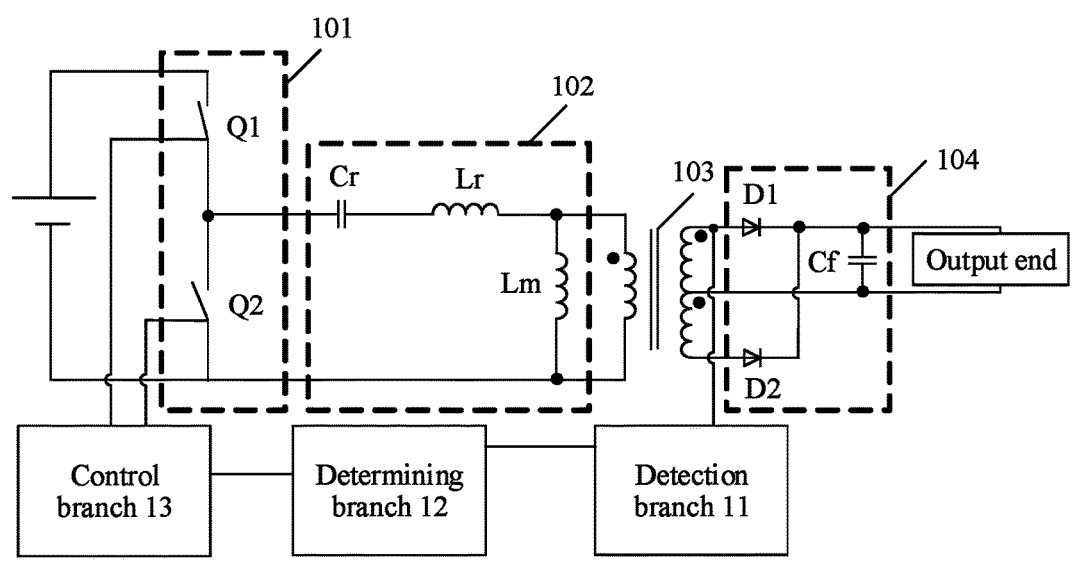
FIG. 5 is a third schematic structural diagram of a resonant power converter according to an embodiment of the present application.

For example, as shown in FIG. 5, the inverter branch 101 is of the half-bridge inverter circuit structure, the resonant branch 102 is of the LLC resonant circuit structure, and the rectification and filtering branch 104 is of the half-wave rectification and filtering circuit structure, to describe, in detail, the resonant power converter provided in this embodiment of the present application.

Generally, the resonant power converter provided in this embodiment of the present application includes a direct current power supply configured to supply power to the inverter branch 101. The inverter branch 101 (a part indicated by a dashed block in FIG. 5) specifically includes a first switching transistor Q1 and a second switching transistor Q2. A control end of the first switching transistor Q1 is connected to the control branch 13, one end of the first switching transistor Q1 is connected to a positive electrode of the power supply, the other end of the first switching transistor Q1 is connected to one end of the second switching transistor Q2, a gate of the second switching transistor Q2 is connected to the control branch 13, and a source of the second switching transistor Q2 is connected to a negative electrode of the power supply. The resonant branch 102 (a part indicated by a dashed block in FIG. 5) specifically includes an excitation inductor Lm, a resonant inductor Lr, and a resonant capacitor Cr that are connected in series. One end of the resonant capacitor Cr is connected to the drain of the second switching transistor Q2, the other end of the resonant capacitor Cr is connected to one end of the resonant inductor Lr, the other end of the resonant inductor Lr is connected to one end of the excitation inductor Lm, the other end of the excitation inductor Lm is connected to the negative electrode of the power supply, the one end of the excitation inductor Lm is connected to a dotted terminal of the primary side of the transformer 103, and the other end of the excitation inductor Lm is connected to the other end of the primary side of the transformer 103. The rectification and filtering branch 104 (a part indicated by a dashed block in FIG. 5) specifically includes a first diode D1, a second diode D2, and a filter capacitor Cf. An input end of the first diode D1 is connected to one end of the secondary side of the transformer 103, an output end of the first diode D1 is connected to one end of the filter capacitor Cf, an input end of the second diode D2 is connected to the other end of the secondary side of the transformer 103, and an output end of the second diode D2 is connected to the other end of the filter capacitor Cf.

It should be further noted that one end of the filter capacitor Cf is usually connected to one end of an output end, the other end of the filter capacitor Cf is connected to the other end of the output end, and the output end is usually a battery. Current directions at the primary side and the secondary side of the transformer 103 are the same.

The control branch 13 separately sends the drive signal to the gate of the first switching transistor Q1 and the gate of the second switching transistor Q2. The drive signal sent to the first switching transistor Q1 and the drive signal sent to the second switching transistor Q2 have inverse phases and same frequency. Therefore, when the first switching transistor Q1 is conducted, the first diode D1 is correspondingly conducted. In this case, the determining branch 12 obtains, by comparing, a location relationship between a rising edge of the drive signal of the first switching transistor Q1 and a rising edge of the pulse signal corresponding to the secondary current and a location relationship between a falling edge of the drive signal of the first switching transistor Q1 and a falling edge of the pulse signal corresponding to the secondary current. When the second switching transistor Q2 is conducted, the second diode D2 is correspondingly conducted. In this case, the determining branch 12 obtains, by means of comparison, a location relationship between a rising edge of the drive signal of the second switching transistor Q2 and the rising edge of the pulse signal corresponding to the secondary current and a location relationship between a falling edge of the drive signal of the second switching transistor Q2 and the falling edge of the pulse signal corresponding to the secondary current.

Accordingly, if the determining branch 12 determines that the rising edge of the pulse signal corresponding to the secondary current and the rising edge of the drive signal are synchronous and that the falling edge of the pulse signal corresponding to the secondary current and the falling edge of the drive signal are synchronous, it indicates that the resonant power converter works at a resonant frequency point, and the control branch 13 keeps the frequency of the drive signal unchanged.

If the determining branch 12 determines that the rising edge of the pulse signal corresponding to the secondary current and the rising edge of the drive signal are synchronous and that the falling edge of the pulse signal corresponding to the secondary current lags behind the falling edge of the drive signal, it indicates that the resonant power converter works in a first area, and the control branch 13 needs to decrease the frequency of the drive signal.

If the determining branch 12 determines that the rising edge of the pulse signal corresponding to the secondary current and the rising edge of the drive signal are synchronous and that the falling edge of the pulse signal corresponding to the secondary current leads the falling edge of the drive signal, it indicates that the resonant power converter works in a second area, and the control branch 13 needs to increase the frequency of the drive signal.

If the determining branch 12 determines that the rising edge of the pulse signal corresponding to the secondary current leads the rising edge of the drive signal and that the falling edge of the pulse signal corresponding to the secondary current leads the falling edge of the drive signal, it indicates that the resonant power converter works in a third area. In this case, to avoid breakdown, generation of the drive signal needs to be stopped first, and after the control branch of the resonant power converter increases the frequency of the drive signal, the control branch of the resonant power converter resumes the generation of the drive signal and sends the drive signal to the inverter branch of the resonant power converter. Then, it is determined whether the resonant power converter still works in the third area, and if the resonant power converter still works in the third area, the generation of the drive signal is stopped again, and the frequency of the drive signal is further increased, so that the resonant power converter finally works at the resonant frequency point.

Figure 6:
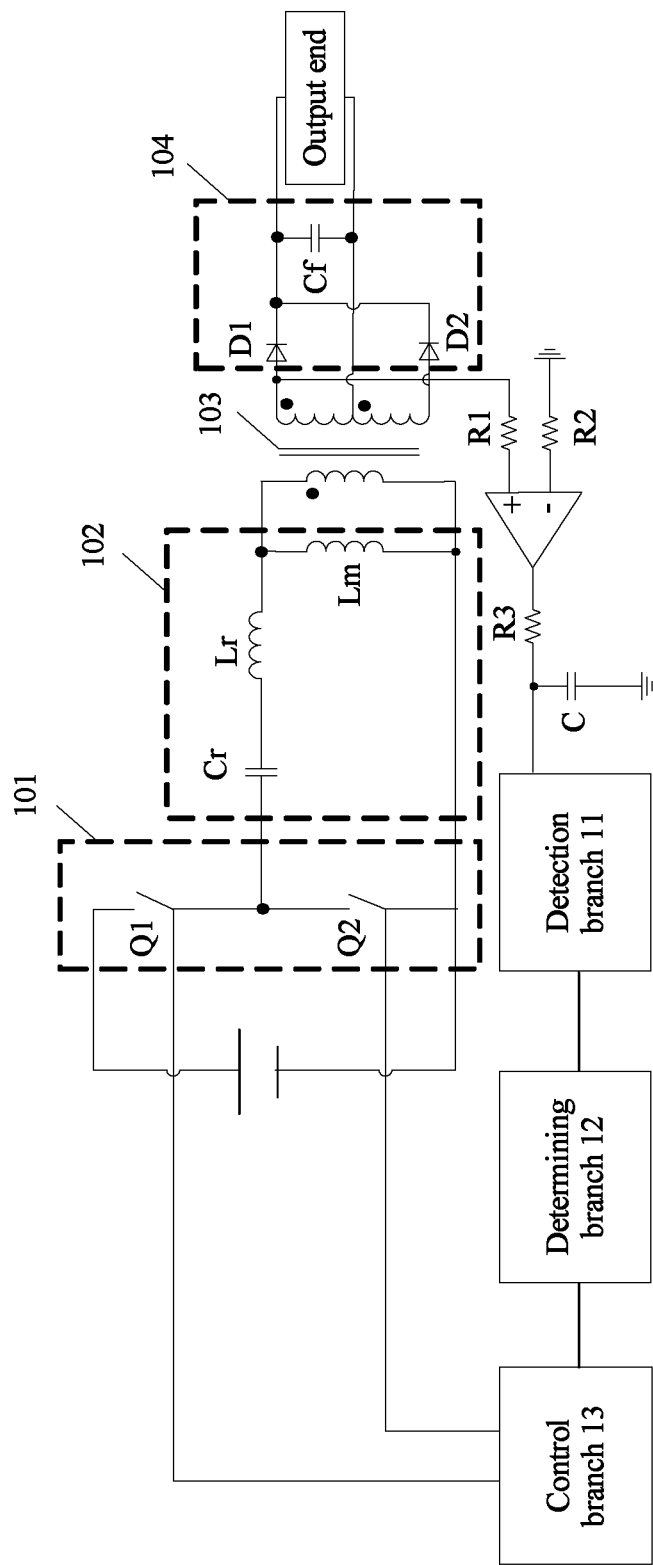
FIG. 6 is a fourth schematic structural diagram of a resonant power converter according to an embodiment of the present application.

Optionally, as shown in FIG. 6, for example, the inverter branch 101 is of the half-bridge inverter circuit structure, the resonant branch 102 is of the LLC resonant circuit structure, and the rectification and filtering branch 104 is of the half-wave rectification and filtering circuit structure. The sampling circuit 14 may specifically include: a comparator, a first resistor R1, a second resistor R2, a third resistor R3, and a capacitor C.

An output end of the comparator is connected to one end of the third resistor R3, one end of the capacitor C is connected to the other end of the third resistor R3, the other end of the third resistor R3 is connected to the detection branch 11, a positive input end of the comparator is connected to one end of the first resistor R1, a negative input end of the comparator is connected to one end of the second resistor R2, the other end of the first resistor R1 is connected to both the secondary side of the transformer 103 and the rectification and filtering branch 104, and the other end of the second resistor R2 and the other end of the capacitor C are grounded.

It should be noted that each of the first resistor R1, the second resistor R2, and the third resistor R3 included in the sampling circuit 14 may be a resistor equivalent to multiple resistors that are connected in series or in parallel, and the capacitor C may be a capacitor equivalent to multiple capacitors that are connected in series or in parallel. This is not limited in this embodiment of the present application.

Figure 7:
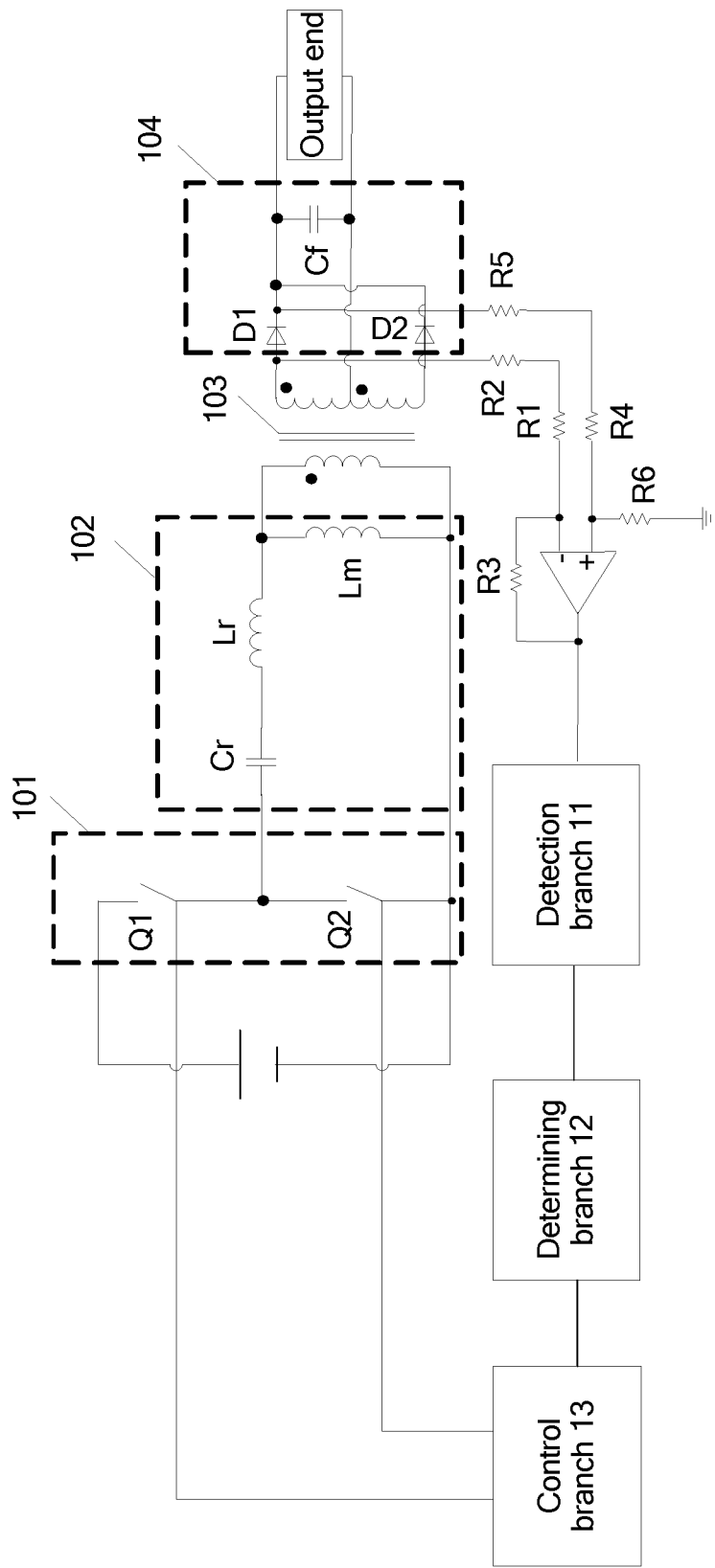
FIG. 7 is a fifth schematic structural diagram of a resonant power converter according to an embodiment of the present application.

Optionally, as shown in FIG. 7, for example, the inverter branch 101 is of the half-bridge inverter circuit structure, the resonant branch 102 is of the LLC resonant circuit structure, and the rectification and filtering branch 104 is of the half-wave rectification and filtering circuit structure. The sampling circuit 14 specifically includes: a comparator, a first resistor R1, a second resistor R2, a third resistor R3, a fourth resistor R4, a fifth resistor R5, and a sixth resistor R6.

An output end of the comparator is connected to the detection branch 11, a negative input end of the comparator is connected to one end of the first resistor R1, the other end of the first resistor R1 is connected to one end of the second resistor R2, the other end of the second resistor R2 is connected to both the secondary side of the transformer 103 and the rectification and filtering branch 104, one end of the third resistor R3 is connected to the output end of the comparator, the other end of the third resistor R3 is connected to the negative input end of the comparator, a positive input end of the comparator is connected to one end of the fourth resistor R4, the other end of the fourth resistor R4 is connected to one end of the fifth resistor R5, the other end of the fifth resistor R5 is connected to the rectification and filtering branch 104, the positive input end of the comparator is connected to one end of the sixth resistor R6, and the other end of the sixth resistor R6 is grounded.

It should be noted that each of the first resistor R1, the second resistor R2, the third resistor R3, the fourth resistor R4, the fifth resistor R5, and the sixth resistor R6 included in the sampling circuit 14 may be a resistor equivalent to multiple resistors that are connected in series or in parallel, and this is not limited in this embodiment of the present application.

It may be understood that structures of two types of sampling circuits 14 provided in this embodiment of the present application are only implementations of the sampling circuit 14, and any structure that can sample the secondary current may be the sampling circuit 14 mentioned in this embodiment of the present application. This is not limited in this embodiment of the present application.

Figure 8:
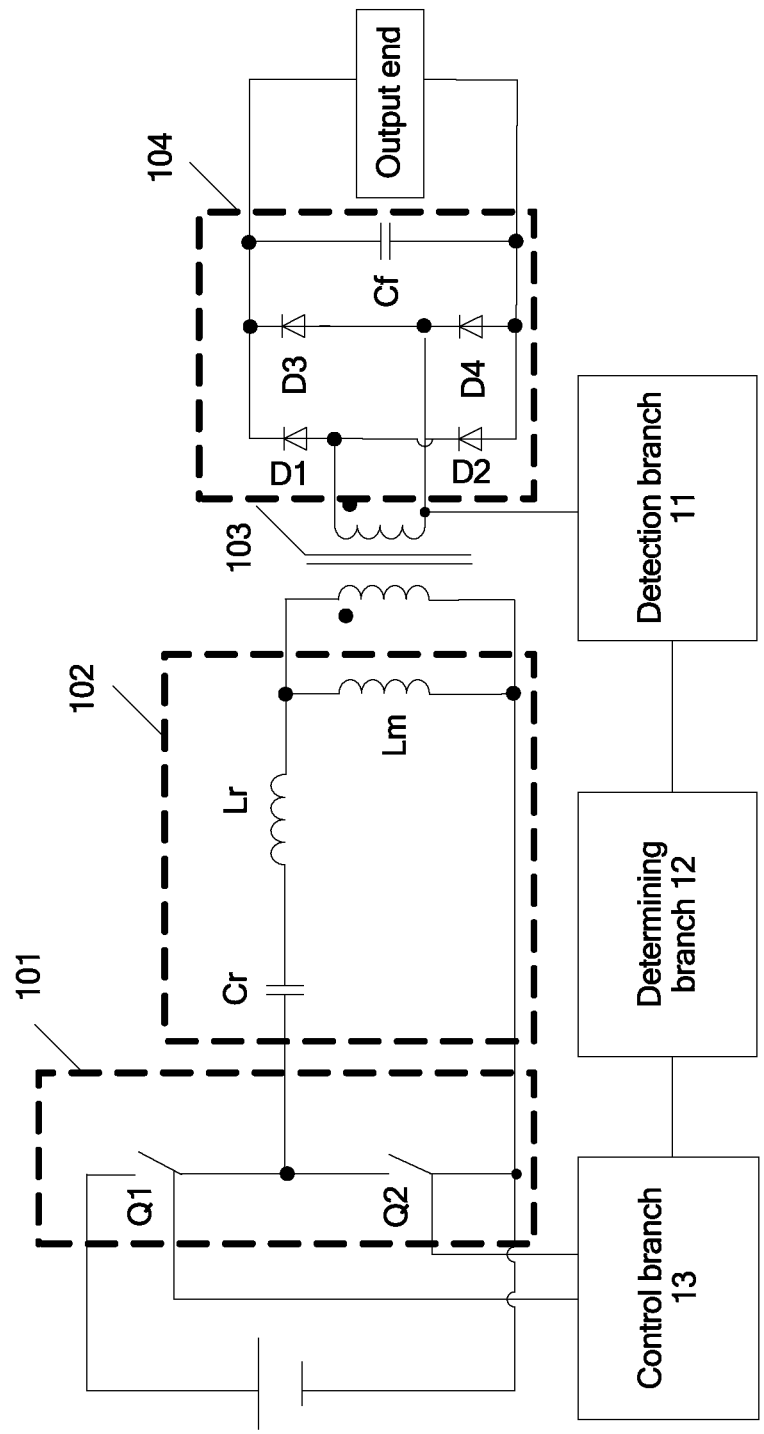
FIG. 8 is a sixth schematic structural diagram of a resonant power converter according to an embodiment of the present application.

For example, as shown in FIG. 8, the inverter branch 101 is of the half-bridge circuit structure, the resonant branch 102 is of the LLC resonant circuit structure, and the rectification and filtering branch 104 is of the full-wave rectification and filtering circuit structure, to describe, in detail, the resonant power converter provided in this embodiment of the present application.

Generally, the resonant power converter provided in this embodiment of the present application includes a direct current power supply configured to supply power to the inverter branch 101. The inverter branch 101 (a part indicated by a dashed block in FIG. 8) specifically includes a first switching transistor Q1 and a second switching transistor Q2. A gate of the first switching transistor Q1 is connected to the control branch 13, a drain of the first switching transistor Q1 is connected to a positive electrode of the power supply, a source of the first switching transistor Q1 is connected to a drain of the second switching transistor Q2, a gate of the second switching transistor Q2 is connected to the control branch 13, and a source of the second switching transistor Q2 is connected to a negative electrode of the power supply. The resonant branch 102 (a part indicated by a dashed block in FIG. 8) specifically includes an excitation inductor Lm, a resonant inductor Lr, and a resonant capacitor Cr that are connected in series. One end of the resonant capacitor Cr is connected to the drain of the second switching transistor Q2, the other end of the resonant capacitor Cr is connected to one end of the resonant inductor Lr, the other end of the resonant inductor Lr is connected to one end of the excitation inductor Lm, the other end of the excitation inductor Lm is connected to the negative electrode of the power supply, the one end of the excitation inductor Lm is connected to one end of the primary side of the transformer 103, and the other end of the excitation inductor Lm is connected to the other end of the primary side of the transformer 103. The rectification and filtering branch 104 (a part indicated by a dashed block in FIG. 8) specifically includes a first diode D1, a second diode D2, a third diode D3, a fourth diode D4, and a filter capacitor Cf. An input end of the first diode D1 is connected to one end of the secondary side of the transformer 103, an output end of the first diode D1 is connected to one end of the filter capacitor Cf, an output end of the second diode D2 is connected to the one end of the secondary side of the transformer 103, an input end of the second diode D2 is connected to the other end of the filter capacitor Cf, an output end of the third diode D3 is connected to the other end of the filter capacitor Cf, an output end of the third diode D3 is connected to the one end of the filter capacitor Cf, an output end of the fourth diode D4 is connected to the other end of the secondary side of the transformer 103, and an input end of the fourth diode D4 is connected to the other end of the filter capacitor Cf.

It should be further noted that one end of the filter capacitor Cf is usually connected to one end of an output end, the other end of the filter capacitor Cf is connected to the other end of the output end, and the output end is usually a resistor. Current directions at the primary side and the secondary side of the transformer 103 are the same.

The control branch 13 separately sends the drive signal to the gate of the first switching transistor Q1 and the gate of the second switching transistor Q2. The drive signal sent to the first switching transistor Q1 and the drive signal sent to the second switching transistor Q2 have inverse phases and same frequency. Therefore, when the first switching transistor Q1 is conducted, the first diode D1 and the second diode D2 are each correspondingly conducted. In this case, the determining branch 12 obtains, by means of comparison, a location relationship between a rising edge of the drive signal of the first switching transistor Q1 and a rising edge of the pulse signal corresponding to the secondary current and a location relationship between a falling edge of the drive signal of the first switching transistor Q1 and a falling edge of the pulse signal corresponding to the secondary current. When the second switching transistor Q2 is conducted, the second diode D2 and the third diode D3 are each correspondingly conducted. In this case, the determining branch 12 obtains, by means of comparison, a location relationship between a rising edge of the drive signal of the second switching transistor Q2 and the rising edge of the pulse signal corresponding to the secondary current and a location relationship between a falling edge of the drive signal of the second switching transistor Q2 and the falling edge of the pulse signal corresponding to the secondary current. A comparison result is the same as a result corresponding to FIG. 5, and details are not described herein again.

Figure 9:
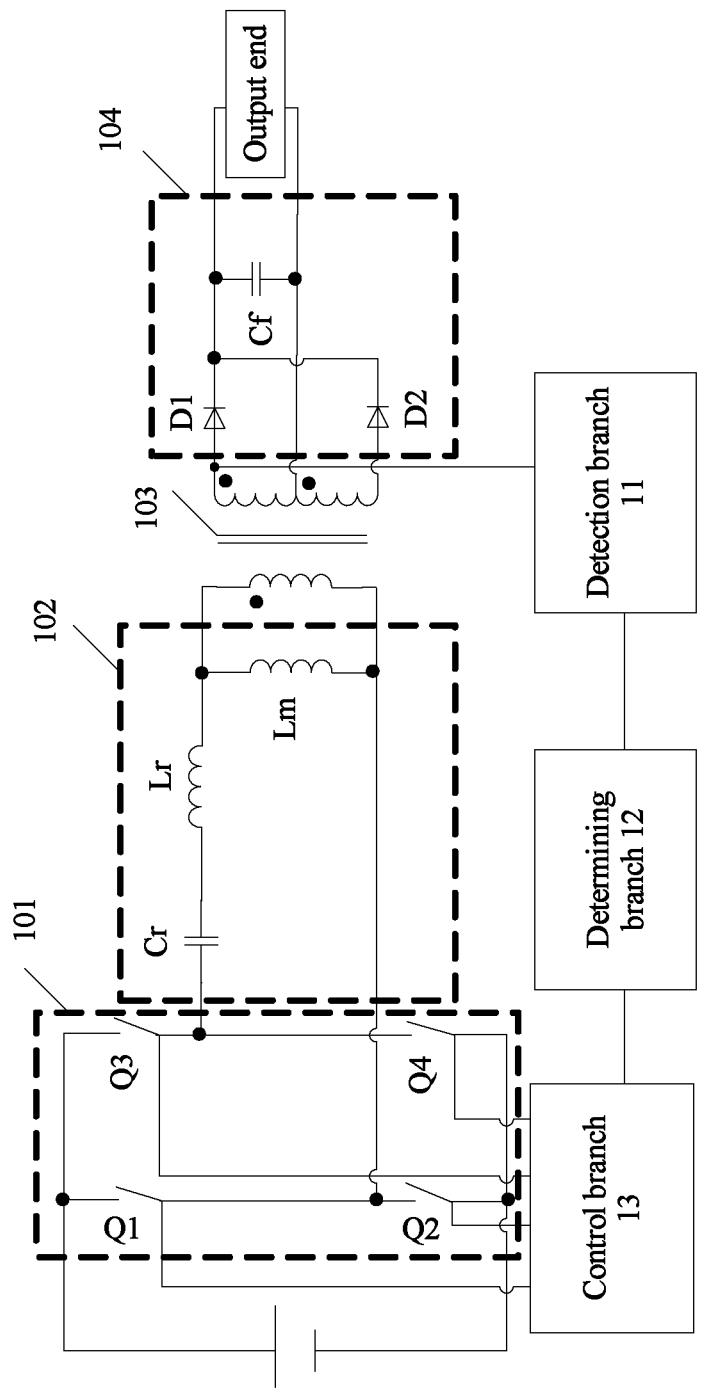
FIG. 9 is a seventh schematic structural diagram of a resonant power converter according to an embodiment of the present application.

For example, as shown in FIG. 9, the inverter branch 101 is of the full-bridge circuit structure, the resonant branch 102 is of the LLC resonant circuit structure, and the rectification and filtering branch 104 is of the half-wave rectification and filtering circuit structure, to describe, in detail, the resonant power converter provided in this embodiment of the present application.

Generally, the resonant power converter provided in this embodiment of the present application includes a direct current power supply configured to supply power to the inverter branch 101. The inverter branch 101 (a part indicated by a dashed block in FIG. 9) specifically includes a first switching transistor Q1, a second switching transistor Q2, a third switching transistor Q3, and a fourth switching transistor Q4. A gate of the first switching transistor Q1 is connected to the control branch 13, a drain of the first switching transistor Q1 is connected to a positive electrode of the power supply, a source of the first switching transistor Q1 is connected to a drain of the second switching transistor Q2, a gate of the second switching transistor Q2 is connected to the control branch 13, a drain of the second switching transistor Q2 is connected to a source of the third switching transistor Q3, a source of the second switching transistor Q2 is connected to a negative electrode of the power supply, a gate of the third switching transistor Q3 is connected to the control branch 13, a drain of the third switching transistor Q3 is connected to the positive electrode of the power supply, the other end of the third switching transistor is connected to one end of the fourth switching transistor Q4, a control end of the fourth switching transistor Q4 is connected to the control branch 13, and the other end of the fourth switching transistor Q4 is connected to the negative electrode of the power supply. The resonant branch 102 (a part indicated by a dashed block in FIG. 9) specifically includes an excitation inductor Lm, a resonant inductor Lr, and a resonant capacitor Cr that are connected in series. One end of the resonant capacitor Cr is connected to the drain of the second switching transistor Q2, the other end of the resonant capacitor Cr is connected to one end of the resonant inductor Lr, the other end of the resonant inductor Lr is connected to one end of the excitation inductor Lm, the other end of the excitation inductor Lm is connected to the negative electrode of the power supply, the one end of the excitation inductor Lm is connected to one end of the primary side of the transformer 103, and the other end of the excitation inductor Lm is connected to the other end of the primary side of the transformer 103. The rectification and filtering branch 104 (a part indicated by a dashed block in FIG. 9) specifically includes: a first diode D1, a second diode D2, and a filter capacitor Cf. An input end of the first diode D1 is connected to one end of the secondary side of the transformer 103, an output end of the first diode D1 is connected to one end of the filter capacitor Cf, an input end of the second diode D2 is connected to the other end of the secondary side of the transformer 103, and an output end of the second diode D2 is connected to the other end of the filter capacitor Cf.

It should be further noted that one end of the filter capacitor Cf is usually connected to one end of an output end, the other end of the filter capacitor Cf is connected to the other end of the output end, and the output end is usually a resistor. Current directions at the primary side and the secondary side of the transformer 103 are the same.

The control branch 13 separately sends the drive signal to the gate of the first switching transistor Q1 and the gate of the fourth switching transistor Q4, and sends the drive signal to the gate of the second switching transistor Q2 and the gate of the third switching transistor Q3. The drive signal sent to the first switching transistor Q1 and the fourth switching transistor Q4 and the drive signal sent to the second switching transistor Q2 and the third switching transistor Q3 have inverse phases and same frequency. Therefore, when the first switching transistor Q1 and the fourth switching transistor Q4 are each conducted, the first diode D1 is correspondingly conducted. In this case, the determining branch 12 obtains, by means of comparison, a location relationship between a rising edge of the drive signal of the first switching transistor Q1 or the fourth switching transistor Q4 and a rising edge of the pulse signal corresponding to the secondary current and a location relationship between a falling edge of the drive signal of the first switching transistor Q1 or the fourth switching transistor Q4 and a falling edge of the pulse signal corresponding to the secondary current. When the second switching transistor Q2 and the third switching transistor Q3 are each conducted, the second diode D2 is correspondingly conducted. In this case, the determining branch 12 obtains, by means of comparison, a location relationship between a rising edge of the drive signal of the second switching transistor Q2 or the third switching transistor Q3 and the rising edge of the pulse signal corresponding to the secondary current and a location relationship between a falling edge of the drive signal of the second switching transistor Q2 or the third switching transistor Q3 and the falling edge of the pulse signal corresponding to the secondary current. A comparison result is the same as a result corresponding to FIG. 5, and details are not described herein again.

Figure 10:
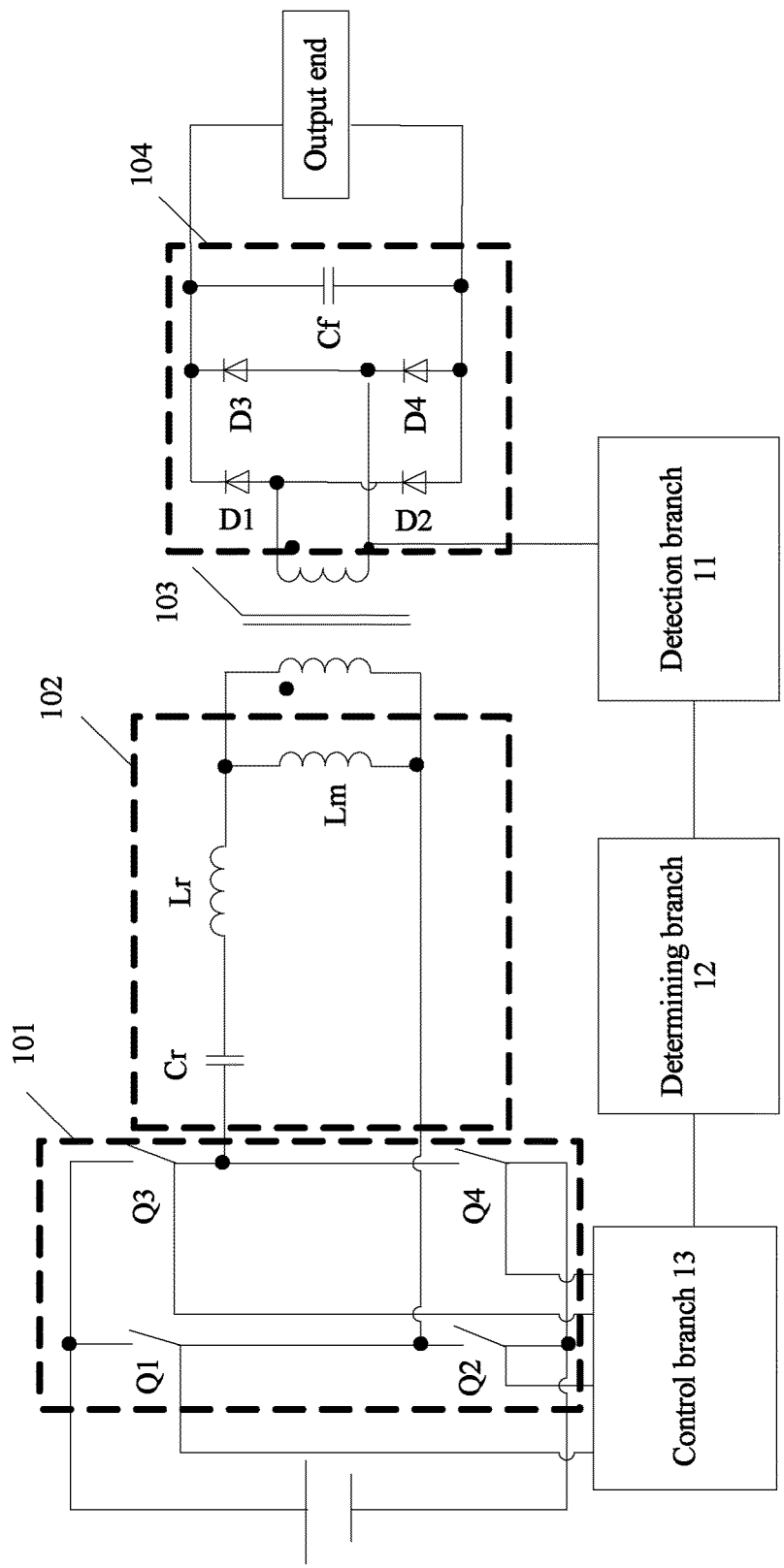
FIG. 10 is an eighth schematic structural diagram of a resonant power converter according to an embodiment of the present application.

For example, as shown in FIG. 10, the inverter branch 101 is of the full-bridge circuit structure, the resonant branch 102 is of the LLC resonant circuit structure, and the rectification and filtering branch 104 is of the full-wave rectification and filtering circuit structure, to describe, in detail, the resonant power converter provided in this embodiment of the present application.

Generally, the resonant power converter provided in this embodiment of the present application includes a direct current power supply configured to supply power to the inverter branch 101. The inverter branch 101 (a part indicated by a dashed block in FIG. 10) specifically includes a first switching transistor Q1, a second switching transistor Q2, a third switching transistor Q3, and a fourth switching transistor Q4. A gate of the first switching transistor Q1 is connected to the control branch 13, a drain of the first switching transistor Q1 is connected to a positive electrode of the power supply, a source of the first switching transistor Q1 is connected to a drain of the fourth switching transistor Q2, a gate of the second switching transistor Q2 is connected to the control branch 13, a drain of the second switching transistor Q2 is connected to a source of the third switching transistor Q3, a source of the second switching transistor Q2 is connected to a negative electrode of the power supply, a gate of the third switching transistor Q3 is connected to the control branch 13, a drain of the third switching transistor Q3 is connected to the positive electrode of the power supply, the other end of the third switching transistor Q3 is connected to one end of the fourth switching transistor Q4, a gate of the fourth switching transistor Q4 is connected to the control branch 13, and a source of the fourth switching transistor Q4 is connected to the negative electrode of the power supply. The resonant branch 102 (a part indicated by a dashed block in FIG. 10) specifically includes an excitation inductor Lm, a resonant inductor Lr, and a resonant capacitor Cr that are connected in series. One end of the resonant capacitor Cr is connected to a point at which the third switching transistor Q3 and the fourth switching transistor Q4 intersects, the other end of the resonant capacitor Cr is connected to one end of the resonant inductor Lr, the other end of the resonant inductor Lr is connected to one end of the excitation inductor Lm, the other end of the excitation inductor Lm is connected to a point at which the first switching transistor Q1 and the second switching transistor Q2 intersects, the one end of the excitation inductor Lm is connected to one end of the primary side of the transformer 103, and the other end of the excitation inductor Lm is connected to the other end of the primary side of the transformer 103. The rectification and filtering branch 104 (a part indicated by a dashed block in FIG. 10) specifically includes a first diode D1, a second diode D2, a third diode D3, a fourth diode D4, and a filter capacitor Cf. An input end of the first diode D1 is connected to one end of the secondary side of the transformer 103, an output end of the first diode D1 is connected to one end of the filter capacitor Cf, an output end of the second diode D2 is connected to the one end of the secondary side of the transformer 103, an input end of the second diode D2 is connected to the other end of the filter capacitor Cf, an input end of the third diode D3 is connected to the other end of the filter capacitor Cf, an output end of the third diode D3 is connected to the one end of the filter capacitor Cf, an output end of the fourth diode D4 is connected to the other end of the secondary side of the transformer 103, and an input end of the fourth diode D4 is connected to the other end of the filter capacitor Cf.

It should be further noted that one end of the filter capacitor Cf is usually connected to one end of an output end, the other end of the filter capacitor Cf is connected to the other end of the output end, and the output end is usually a resistor. Current directions at the primary side and the secondary side of the transformer 103 are the same.

The control branch 13 separately sends the drive signal to the gate of the first switching transistor Q1 and the gate of the fourth switching transistor Q4, and sends the drive signal to the gate of the second switching transistor Q2 and the gate of the third switching transistor Q3. The drive signal sent to the first switching transistor Q1 and the fourth switching transistor Q4 and the drive signal sent to the second switching transistor Q2 and the third switching transistor Q3 have inverse phases and same frequency. Therefore, when the first switching transistor Q1 and the fourth switching transistor Q4 are each conducted, the first diode D1 and the second diode D4 are each correspondingly conducted. In this case, the determining branch 12 obtains, by means of comparison, a location relationship between a rising edge of the drive signal of the first switching transistor Q1 or the fourth switching transistor Q4 and a rising edge of the pulse signal corresponding to the secondary current and a location relationship between a falling edge of the drive signal of the first switching transistor Q1 or the fourth switching transistor Q4 and a falling edge of the pulse signal corresponding to the secondary current. When the second switching transistor Q2 and the third switching transistor Q3 are each conducted, the second diode D2 and the third diode D3 are each correspondingly conducted. In this case, the determining branch 12 obtains, by means of comparison, a location relationship between a rising edge of the drive signal of the second switching transistor Q2 or the third switching transistor Q3 and the rising edge of the pulse signal corresponding to the secondary current and a location relationship between a falling edge of the drive signal of the second switching transistor Q2 or the third switching transistor Q3 and the falling edge of the pulse signal corresponding to the secondary current. A comparison result is the same as a result corresponding to FIG. 5, and details are not described herein again.

Figure 11:
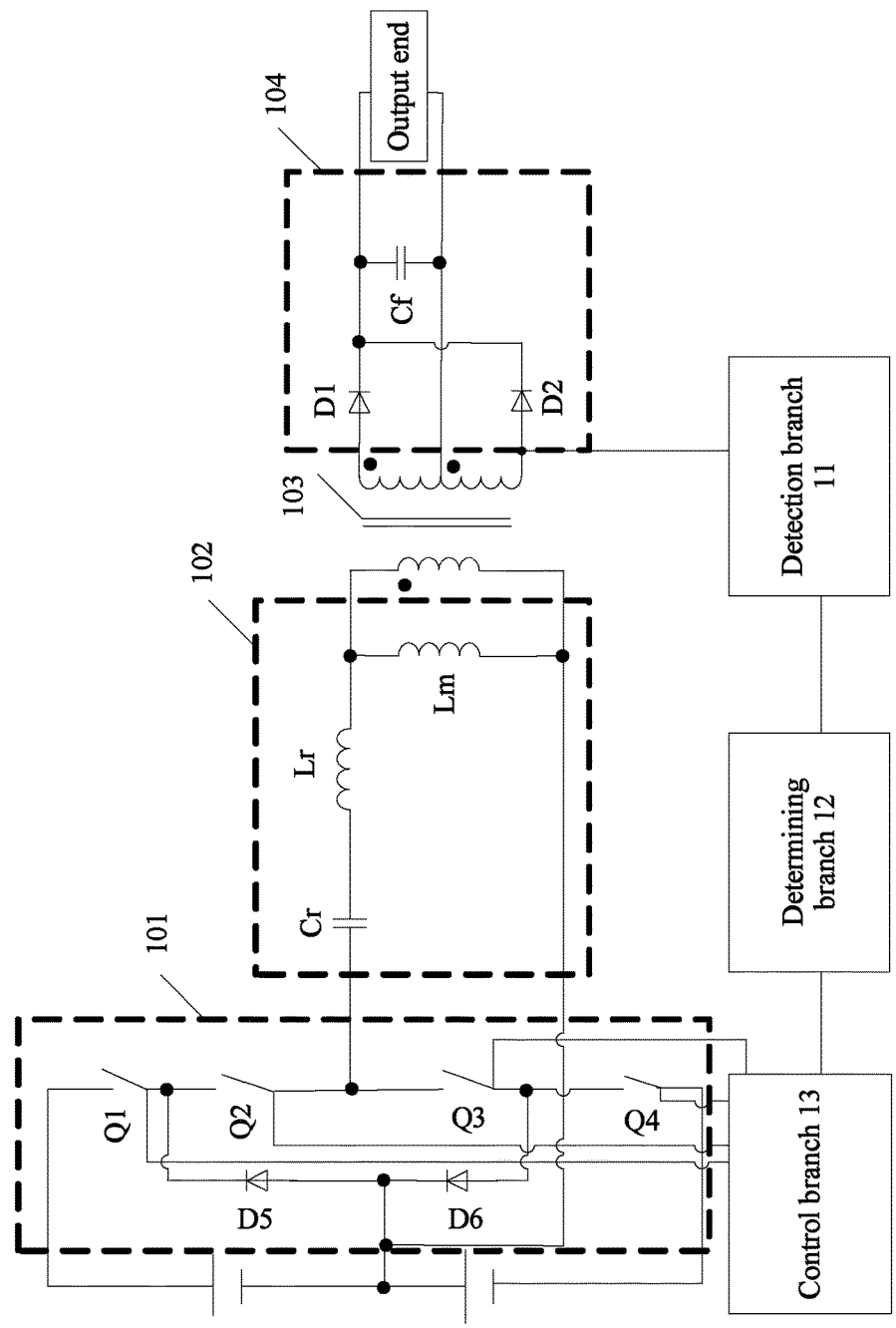
FIG. 11 is a ninth schematic structural diagram of a resonant power converter according to an embodiment of the present application.

For example, as shown in FIG. 11, the inverter branch 101 is of the three-level inverter circuit structure, the resonant branch 102 is of the LLC resonant circuit structure, and the rectification and filtering branch 104 is of the half-wave rectification and filtering circuit structure, describe, in detail, the resonant power converter provided in this embodiment of the present application.

Generally, the resonant power converter provided in this embodiment of the present application includes a direct current power supply configured to supply power to the inverter branch 101. The inverter branch 101 (a part indicated by a dashed block in FIG. 11) specifically includes a first switching transistor Q1, a second switching transistor Q2, a third switching transistor Q3, a fourth switching transistor Q4, a fifth diode D5, and a sixth diode D6. A gate of the first switching transistor Q1 is connected to the control branch 13, a drain of the first switching transistor Q1 is connected to a positive electrode of the power supply, a source of the first switching transistor Q1 is connected to a drain of the second switching transistor Q2, a gate of the second switching transistor Q2 is connected to the control branch 13, a source of the second switching transistor Q2 is connected to a drain of the third switching transistor Q3, a gate of the third switching transistor Q3 is connected to the control branch 13, a source of the third switching transistor Q3 is connected to a drain of the fourth switching transistor Q4, a gate of the fourth switching transistor Q4 is connected to the control branch 13, a source of the fourth switching transistor Q4 is connected to a negative electrode of the power supply, an input end of the fifth diode D5 is connected to an output end of the sixth diode D6, an output end of the fifth diode D5 is connected to the source of the first switching transistor Q1, and an input end of the sixth diode D6 is connected to the source of the third switching transistor Q3. The resonant branch 102 (a part indicated by a dashed block in FIG. 11) specifically includes an excitation inductor Lm, a resonant inductor Lr, and a resonant capacitor Cr that are connected in series. One end of the resonant capacitor Cr is connected to a point at which the second switching transistor Q2 and the third switching transistor Q3 are connected, the other end of the resonant capacitor Cr is connected to one end of the resonant inductor Lr, the other end of the resonant inductor Lr is connected to one end of the excitation inductor Lm, the other end of the excitation inductor Lm is connected to the negative electrode of the power supply, the one end of the excitation inductor Lm is connected to one end of the primary side of the transformer 103, and the other end of the excitation inductor Lm is connected to the other end of the primary side of the transformer 103. The rectification and filtering branch 104 (a part indicated by a dashed block in FIG. 10) specifically includes a first diode D1, a second diode D2, and a filter capacitor Cf. An input end of the first diode D1 is connected to one end of the secondary side of the transformer 103, an output end of the first diode D1 is connected to one end of the filter capacitor Cf, an input end of the second diode D2 is connected to the other end of the secondary side of the transformer 103, and an output end of the second diode D2 is connected to the other end of the filter capacitor Cf.

It should be further noted that one end of the filter capacitor Cf is usually connected to one end of an output end, the other end of the filter capacitor Cf is connected to the other end of the output end, and the output end is usually a resistor. Current directions at the primary side and the secondary side of the transformer 103 are the same.

The control branch 13 separately sends the drive signal to the gate of the first switching transistor Q1 and the gate of the second switching transistor Q2, and sends the drive signal to the gate of the third switching transistor Q3 and the gate of the fourth switching transistor Q4. The drive signal sent to the first switching transistor Q1 and the second switching transistor Q2 and the drive signal sent to the gate of the third switching transistor Q3 and the fourth switching transistor Q4 have inverse phases and same frequency. Therefore, when the first switching transistor Q1 and the second switching transistor Q2 are each conducted, the first diode D1 is correspondingly conducted. In this case, the determining branch 12 obtains, by means of comparison, a location relationship between a rising edge of the drive signal of the first switching transistor Q1 or the second switching transistor Q2 and a rising edge of the pulse signal corresponding to the secondary current and a location relationship between a falling edge of the drive signal of the first switching transistor Q1 or the second switching transistor Q2 and a falling edge of the pulse signal corresponding to the secondary current. When the third switching transistor Q3 and the fourth switching transistor Q4 are each conducted, the second diode D2 is correspondingly conducted. In this case, the determining branch 12 obtains, by means of comparison, a location relationship between a rising edge of the drive signal of the third switching transistor Q3 or the fourth switching transistor Q4 and the rising edge of the pulse signal corresponding to the secondary current and a location relationship between a falling edge of the drive signal of the third switching transistor Q3 or the fourth switching transistor Q4 and the falling edge of the pulse signal corresponding to the secondary current. A comparison result is the same as a result corresponding to FIG. 5, and details are not described herein again.

Figure 12:
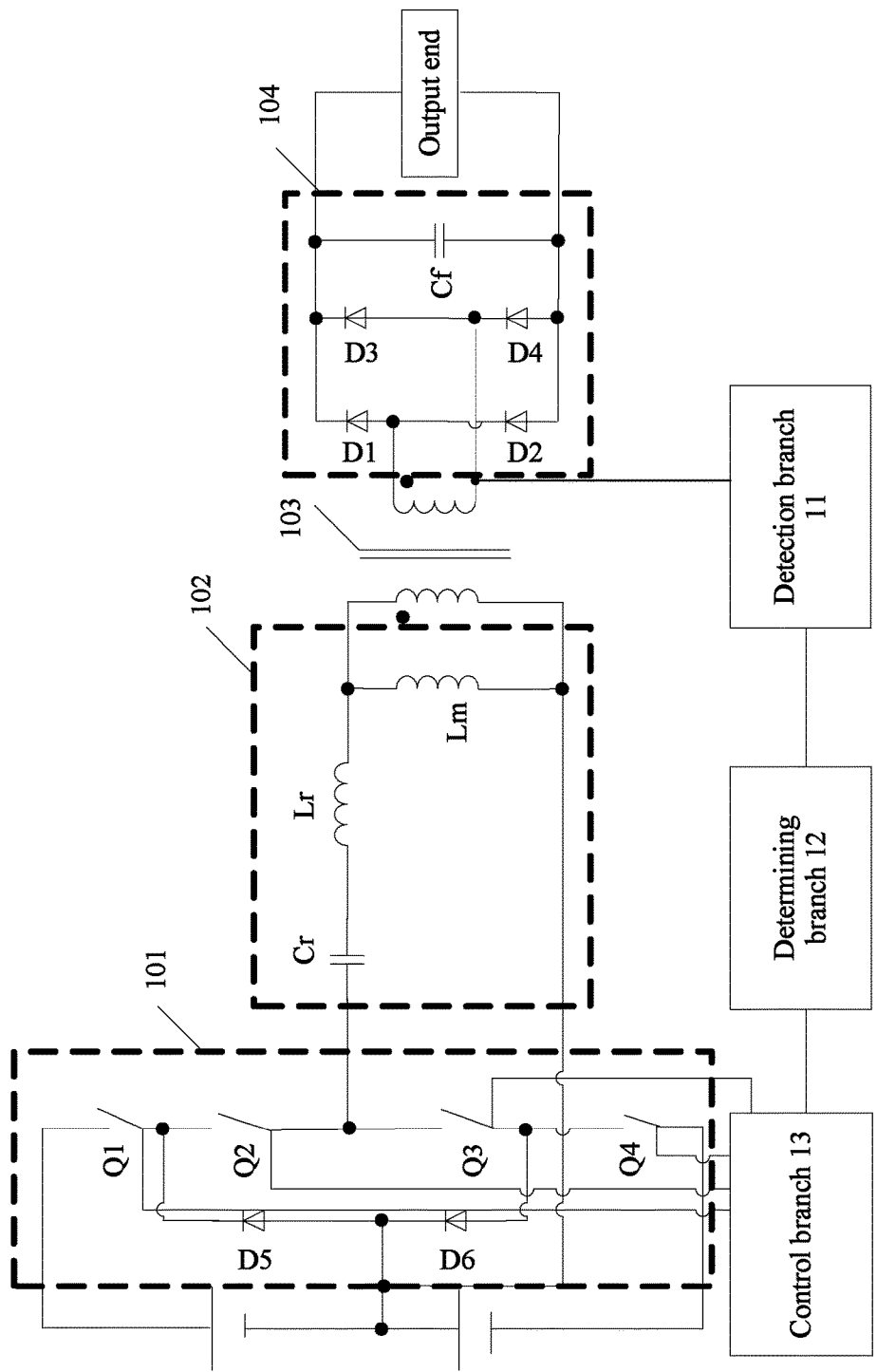
FIG. 12 is a tenth schematic structural diagram of a resonant power converter according to an embodiment of the present application.

For example, as shown in FIG. 12, the inverter branch 101 is of the three-level circuit structure, the resonant branch 102 is of the LLC resonant circuit structure, and the rectification and filtering branch 104 is of the full-wave rectification and filtering circuit structure, to describe, in detail, the resonant power converter provided in this embodiment of the present application.

Generally, the resonant power converter provided in this embodiment of the present application includes a direct current power supply configured to supply power to the inverter branch 101. The inverter branch 101 (a part indicated by a dashed block in FIG. 12) specifically includes a first switching transistor Q1, a second switching transistor Q2, a third switching transistor Q3, a fourth switching transistor Q4, a fifth diode D5, and a sixth diode D6. A gate of the first switching transistor Q1 is connected to the control branch 13, a drain of the first switching transistor Q1 is connected to a positive electrode of the power supply, a source of the first switching transistor Q1 is connected to a drain of the second switching transistor Q2, a gate of the second switching transistor Q2 is connected to the control branch 13, a source of the second switching transistor Q2 is connected to a drain of the third switching transistor Q3, a gate of the third switching transistor Q3 is connected to the control branch 13, a source of the third switching transistor Q3 is connected to a drain of the fourth switching transistor Q4, a gate of the fourth switching transistor Q4 is connected to the control branch 13, a source of the fourth switching transistor Q4 is connected to a negative electrode of the power supply, an input end of the fifth diode D5 is connected to an output end of the sixth diode D6, an output end of the fifth diode D5 is connected to the source of the first switching transistor Q1, and an input end of the sixth diode D6 is connected to the source of the third switching transistor Q3. The resonant branch 102 (a part indicated by a dashed block in FIG. 12) specifically includes an excitation inductor Lm, a resonant inductor Lr, and a resonant capacitor Cr that are connected in series. One end of the resonant capacitor Cr is connected to a point at which the second switching transistor Q2 and the third switching transistor Q3 are connected, the other end of the resonant capacitor Cr is connected to one end of the resonant inductor Lr, the other end of the resonant inductor Lr is connected to one end of the excitation inductor Lm, the other end of the excitation inductor Lm is connected to the negative electrode of the power supply, the one end of the excitation inductor Lm is connected to one end of the primary side of the transformer 103, and the other end of the excitation inductor Lm is connected to the other end of the primary side of the transformer 103. The rectification and filtering branch 104 (a part indicated by a dashed block in FIG. 12) specifically includes a first diode D1, a second diode D2, a third diode D3, a fourth diode D4, and a filter capacitor Cf. An input end of the first diode D1 is connected to one end of the secondary side of the transformer 103, an output end of the first diode D1 is connected to one end of the filter capacitor Cf, an output end of the second diode D2 is connected to the one end of the secondary side of the transformer 103, an input end of the second diode D2 is connected to the other end of the filter capacitor Cf, an input end of the third diode D3 is connected to the other end of the filter capacitor Cf, an output end of the third diode D3 is connected to the one end of the filter capacitor Cf, an output end of the fourth diode D4 is connected to the other end of the secondary side of the transformer 103, and an input end of the fourth diode D4 is connected to the other end of the filter capacitor Cf.

It should be further noted that one end of the filter capacitor Cf is usually connected to one end of an output end, the other end of the filter capacitor Cf is connected to the other end of the output end, and the output end is usually a resistor. Current directions at the primary side and the secondary side of the transformer 103 are the same.

The control branch 13 separately sends the drive signal to the gate of the first switching transistor Q1 and the gate of the second switching transistor Q2, and sends the drive signal to the gate of the third switching transistor Q3 and the gate of the fourth switching transistor Q4. The drive signal sent to the first switching transistor Q1 and the second switching transistor Q2 and the drive signal sent to the gate of the third switching transistor Q3 and the fourth switching transistor Q4 have inverse phases and same frequency. Therefore, when the first switching transistor Q1 and the second switching transistor Q2 are each conducted, the first diode D1 and the second diode D2 are each correspondingly conducted. In this case, the determining branch 12 obtains, by means of comparison, a location relationship between a rising edge of the drive signal of the first switching transistor Q1 or the second switching transistor Q2 and a rising edge of the pulse signal corresponding to the secondary current and a location relationship between a falling edge of the drive signal of the first switching transistor Q1 or the second switching transistor Q2 and a falling edge of the pulse signal corresponding to the secondary current. When the third switching transistor Q3 and the fourth switching transistor Q4 are each conducted, the third diode D3 and the fourth diode D4 are each correspondingly conducted. In this case, the determining branch 12 obtains, by means of comparison, a location relationship between a rising edge of the drive signal of the third switching transistor Q3 or the fourth switching transistor Q4 and the rising edge of the pulse signal corresponding to the secondary current and a location relationship between a falling edge of the drive signal of the third switching transistor Q3 or the fourth switching transistor Q4 and the falling edge of the pulse signal corresponding to the secondary current. A comparison result is the same as a result corresponding to FIG. 5, and details are not described herein again.

It should be noted that, in this embodiment of the present application, that the control branch 13 drives each switching transistor in the inverter branch 101 may be that the control branch 13 is separately connected to each switching transistor, that is, the control branch 13 separately drives each switch; or may be that the control branch 13 is connected to multiple switching transistors that need to be simultaneously conducted. This is not limited in this embodiment of the present application. In examples for describing FIG. 5 to FIG. 12 in this embodiment of the present application, the control branch 13 is separately connected to each switching transistor.

It should be supplemented that a frequency tracking method that is for an LLC resonant power converter and provided in this embodiment of the present application is applied to an open-loop LLC circuit, and an open-loop LLC resonant power converter and a close-loop DC/DC converter may be connected in series for use, to adjust a voltage.

Figure 13:
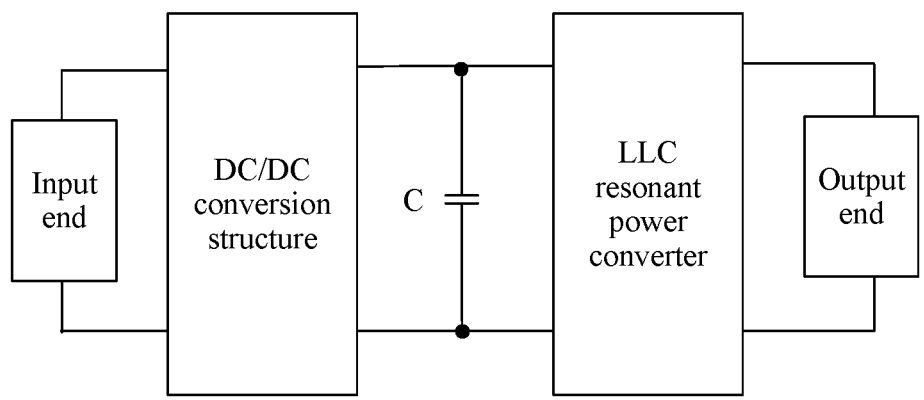
FIG. 13 is a first schematic structural diagram of a DC/DC converter according to an embodiment of the present application.

For example, as shown in FIG. 13, the LLC resonant power converter may be applied to a DC/DC converter that includes one DC/DC conversion structure and one LLC resonant power converter. The DC/DC conversion structure is controlled in a close loop manner. An output voltage of the LLC resonant power converter is sampled and used as a feedback voltage of the DC/DC conversion structure, and an output voltage of the DC/DC conversion structure is adjusted, to adjust switching frequency of the LLC resonant power converter, so that the frequency of the drive signal tracks the resonant frequency of the resonant power converter.

Figure 14:
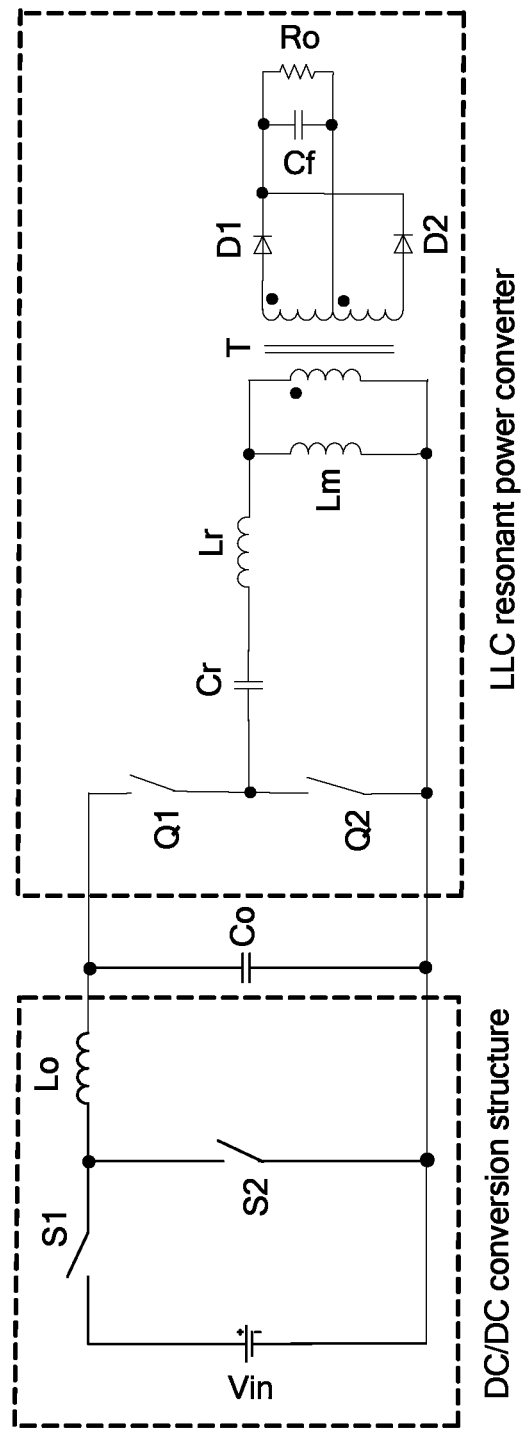
FIG. 14 is a second schematic structural diagram of a DC/DC converter according to an embodiment of the present application.

Specifically, the DC/DC conversion structure may be any single-phase DC/DC conversion structure, and the LLC resonant power converter may be any LLC resonant power converter described in the foregoing embodiment. As shown in FIG. 14, the DC/DC conversion structure is a buck converter, the inverter branch 101 of the LLC resonant power converter is of the half-bridge inverter circuit structure, the resonant branch 102 is of the LLC resonant circuit structure, and the rectification and filtering branch 104 is of the half-wave rectification and filtering circuit structure.

Figure 15:
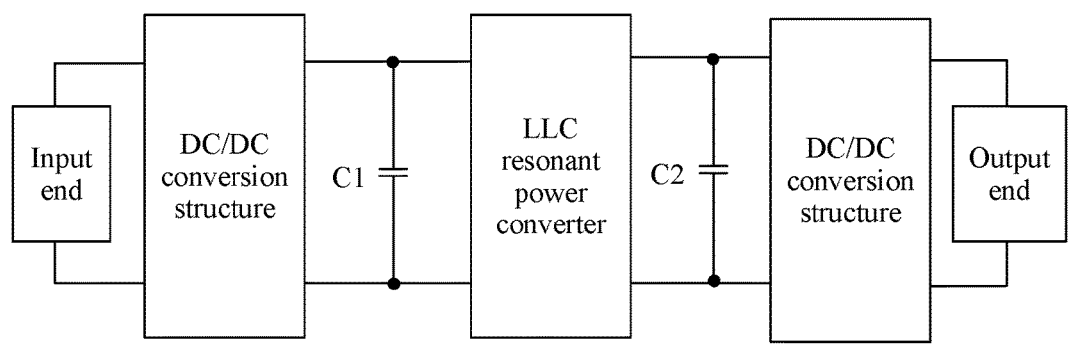
FIG. 15 is a third schematic structural diagram of a DC/DC converter according to an embodiment of the present application.

For example, as shown in FIG. 15, the LLC resonant power converter may be applied to a DC/DC converter that includes two DC/DC conversion structures and one LLC resonant power converter. A voltage of the LLC resonant power converter may be adjusted by using a DC/DC conversion structure on a left side of FIG. 15, or may be adjusted by using a DC/DC conversion structure on a right side of FIG. 15. Adjustment performed by using the DC/DC conversion structure on the left side of FIG. 15 is to ensure that an output voltage of the LLC resonant power converter is stabilized at a specified value, and an output voltage of the DC/DC conversion structure on the left side of FIG. 15 is changed to adjust frequency. Output voltage adjustment performed by using the DC/DC conversion structure on the right side of FIG. 15 is to keep an output voltage of the DC/DC conversion structure on the right side of FIG. 15 unchanged, and an input voltage of the DC/DC conversion structure on the right side of FIG. 15 is changed to adjust frequency.

Figure 16:
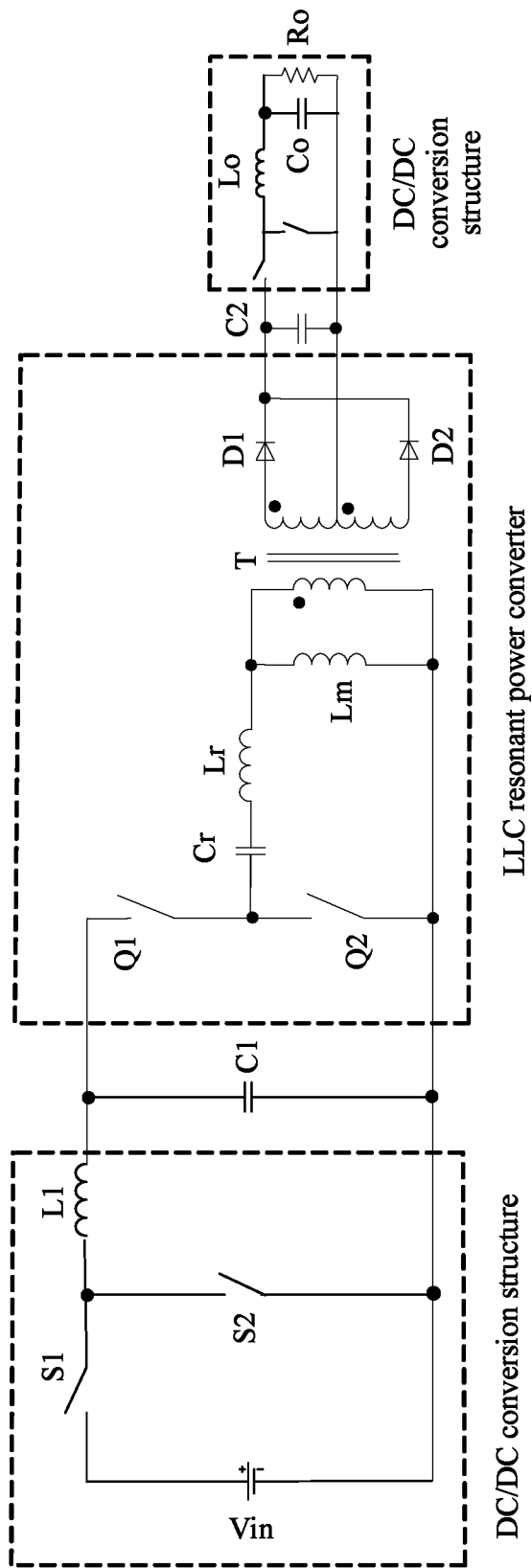
FIG. 16 is a fourth schematic structural diagram of a DC/DC converter according to an embodiment of the present application.

Specifically, the DC/DC conversion structure may be any single-phase DC/DC conversion structure, and the LLC resonant power converter may be any LLC resonant power converter described in the foregoing embodiment. As shown in FIG. 16, each of the two DC/DC conversion structures is a buck converter, the inverter branch 101 of the LLC resonant power converter is of the half-bridge inverter circuit structure, the resonant branch 102 is of the LLC resonant circuit structure, and the rectification and filtering branch 104 is of the half-wave rectification and filtering circuit structure.

The foregoing DC/DC converter controlled in the close loop manner may be a buck converter, a boost converter, or a boost-buck converter, and this is not limited in this embodiment of the present application.

It should be noted that the switching transistor provided in this embodiment of the present application may be an IGBT (insulated gate bipolar transistor), a MOSFET (metal-oxide semiconductor field-effect transistor), a triode, or the like. Each diode provided in the rectification and filtering branch in this embodiment of the present application may be replaced by a synchronous rectifier diode. This is not limited in this embodiment of the present application.

This embodiment of the present application provides the resonant power converter. The resonant power converter includes: the inverter branch, the resonant branch connected to the inverter branch, the transformer connected to the resonant branch, and the rectification and filtering branch connected to the transformer, where the primary side of the transformer is connected to the resonant branch, and the secondary side of the transformer is connected to the rectification and filtering branch; the detection branch connected to both the secondary side of the transformer and the rectification and filtering branch; the determining branch connected to the detection branch; and the control branch connected to both the determining branch and the inverter branch. The detection branch is configured to: obtain the secondary current of the transformer, generate, according to the secondary current, the pulse signal corresponding to the secondary current, and send the pulse signal corresponding to the secondary current to the determining branch. The control branch is configured to generate the drive signal and send the drive signal to the inverter branch and the determining branch. The drive signal is used to drive the inverter branch. The determining branch is configured to: receive the pulse signal that is corresponding to the secondary current and sent by the detection branch and the drive signal sent by the control branch, and generate the first information and send the first information to the control branch according to the pulse signal corresponding to the secondary current and the drive signal. The first information is used to indicate the resonant status of the resonant power converter. The control branch is further configured to: receive the first information sent by the determining branch, and control the frequency of the drive signal according to the first information. Based on the foregoing descriptions, the determining branch can receive the pulse signal that is corresponding to the secondary current and sent by the detection branch, and generate, according to the pulse signal corresponding to the secondary current and the drive signal, the first information that is used to indicate the resonant status of the resonant power converter, so that the control branch controls the frequency of the drive signal according to the first information. Therefore, the resonant status of the resonant power converter is determined by sampling the secondary current, and the frequency of the drive signal is controlled to track the resonant frequency of the resonant power converter.

Figure 17:
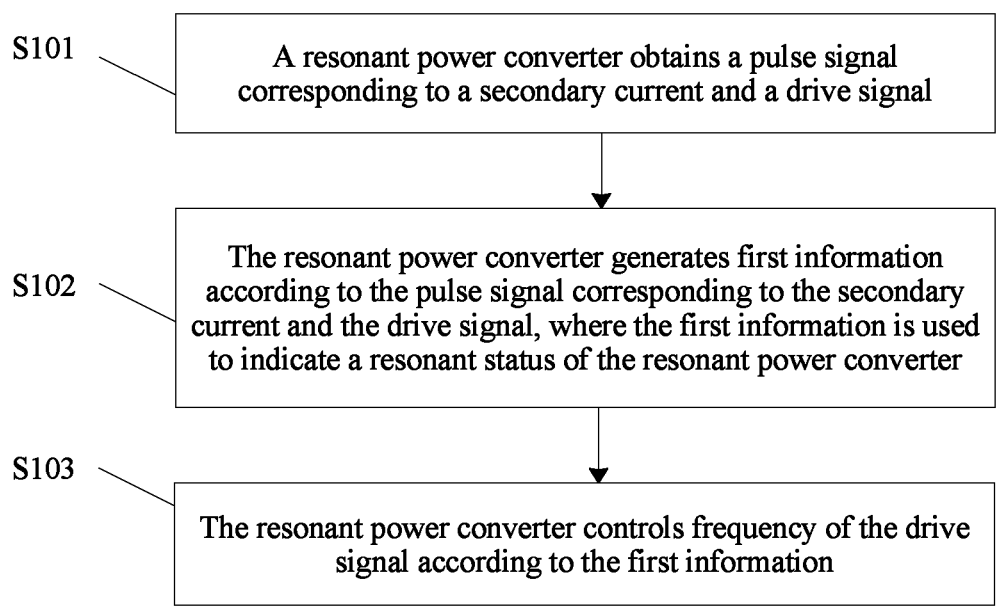
FIG. 17 is a first schematic flowchart of a frequency tracking method for a resonant power converter according to an embodiment of the present application.

An embodiment of the present application further provides a frequency tracking method for a resonant power converter. The frequency tracking method is applied to the resonant power converter described in the foregoing embodiment. The resonant power converter includes: an inverter branch, a resonant branch connected to the inverter branch, a transformer connected to the resonant branch, and a rectification and filtering branch connected to the transformer, where a primary side of the transformer is connected to the resonant branch, and a secondary side of the transformer is connected to the rectification and filtering branch; a detection branch connected to both the secondary side of the transformer and the rectification and filtering branch; a determining branch connected to the detection branch; and a control branch connected to both the determining branch and the inverter branch. As shown in FIG. 17, the method includes the following steps.

S101. The resonant power converter obtains a pulse signal corresponding to a secondary current and a drive signal.

Specifically, the determining branch of the resonant power converter obtains the pulse signal corresponding to the secondary current and the drive signal.

Figure 18:
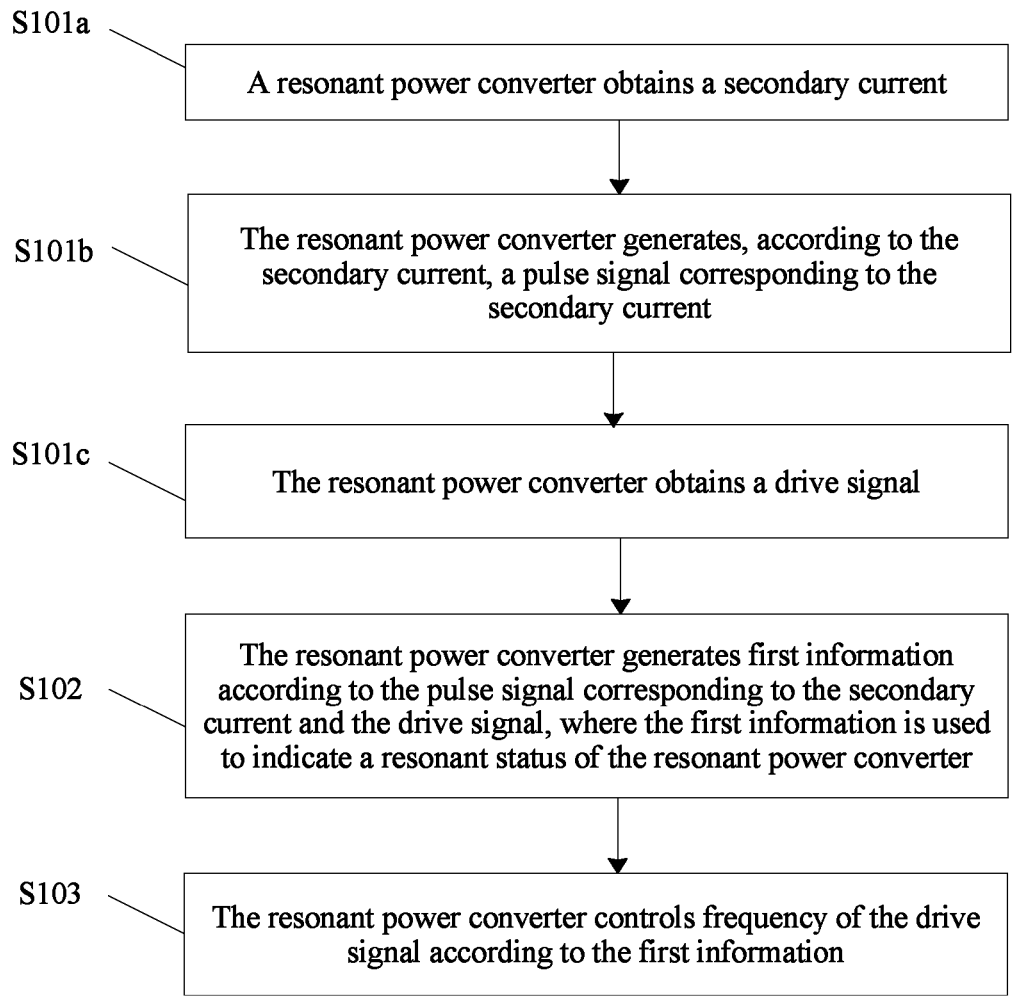
FIG. 18 is a second schematic flowchart of a frequency tracking method for a resonant power converter according to an embodiment of the present application.

Specifically, as shown in FIG. 18, step S101 may include S101a to S101c.

S101a. The resonant power converter obtains the secondary current.

The detection branch of the resonant power converter may directly obtain a secondary current of a transformer in a main power circuit from a secondary side of the transformer, or a sampling circuit of the resonant power converter may sample a secondary current of a transformer and then send the secondary current to the detection branch.

S101b. The resonant power converter generates, according to the secondary current, the pulse signal corresponding to the secondary current.

A method used by the detection branch of the resonant power converter to generate, according to the secondary current, the pulse signal corresponding to the secondary current may include: converting the secondary current into a voltage signal by using a resistor, and comparing the voltage signal with 0 to obtain the pulse signal corresponding to the secondary current corresponding to a forward current time; or if the sampling circuit samples a voltage of a diode, determining only positive or negative of the voltage of the diode, and outputting a high level when the voltage of the diode is positive, or outputting a low level when the voltage of the diode is negative.

Then, the detection branch of the resonant power converter sends the pulse signal corresponding to the secondary current to the determining branch.

S101c. The resonant power converter obtains the drive signal.

Specifically, the determining branch of the resonant power converter obtains the drive signal sent by the control branch.

S102. The resonant power converter generates first information according to the pulse signal corresponding to the secondary current and the drive signal, where the first information is used to indicate a resonant status of the resonant power converter.

S103. The resonant power converter controls frequency of the drive signal according to the first information.

Figure 19:
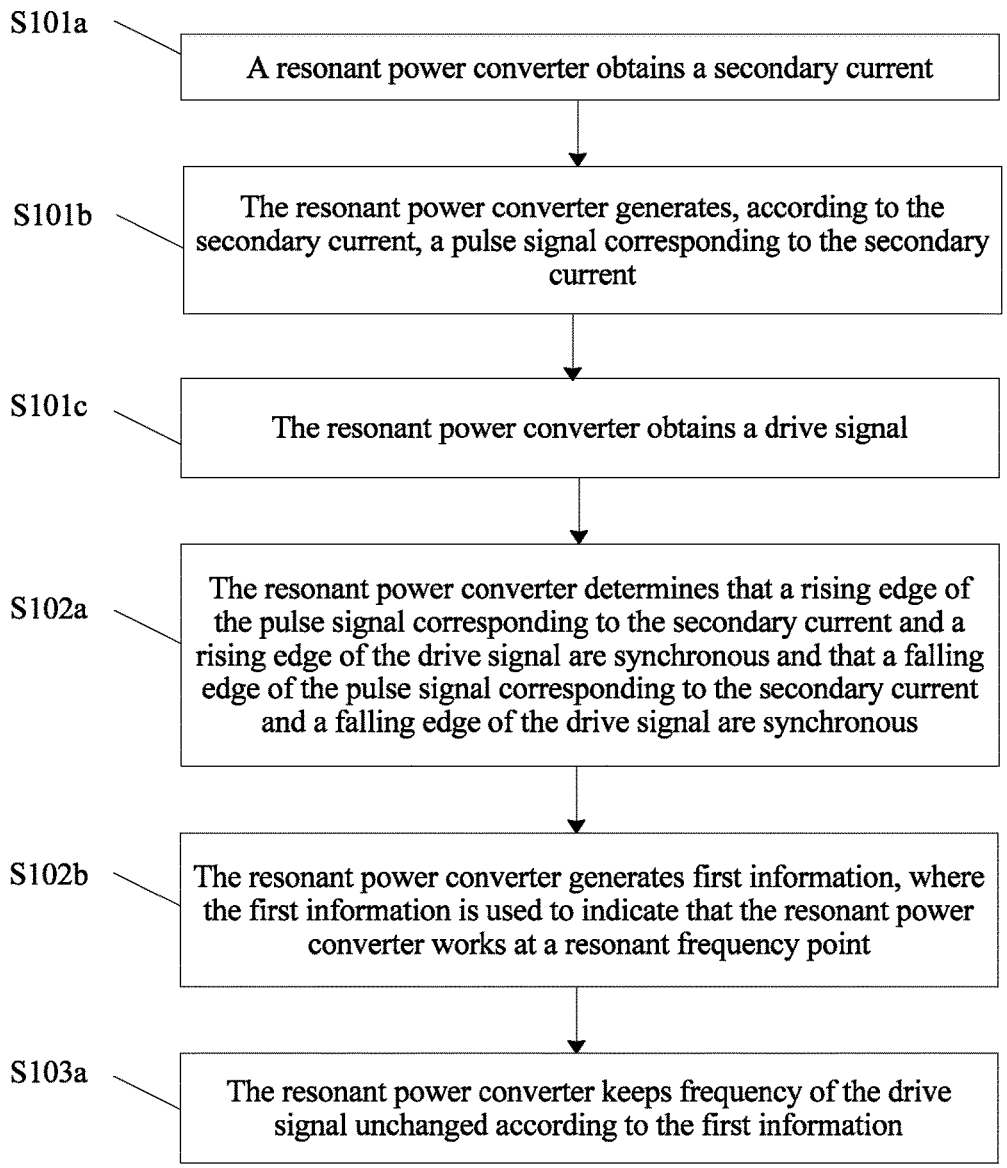
FIG. 19 is a third schematic flowchart of a frequency tracking method for a resonant power converter according to an embodiment of the present application.

Specifically, as shown in FIG. 19, step S102 may include S102a and S102b.

S102a. The resonant power converter determines that a rising edge of the pulse signal corresponding to the secondary current and a rising edge of the drive signal are synchronous and that a falling edge of the pulse signal corresponding to the secondary current and a falling edge of the drive signal are synchronous.

S102b. The resonant power converter generates the first information, where the first information is used to indicate that the resonant power converter works at a resonant frequency point.

Specifically, the determining branch of the resonant power converter performs step S102a and S102b, and sends the first information to the control branch of the resonant power converter.

Correspondingly, Step S103 may include S103a.

S103a. The resonant power converter keeps the drive signal unchanged according to the first information.

Specifically, the control branch of the resonant power converter performs step S103a.

Figure 20:
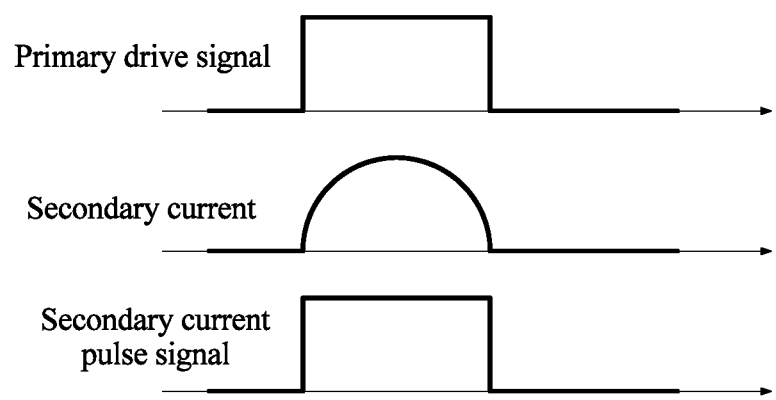
FIG. 20 is a waveform diagram when a resonant power converter works at a resonant frequency point according to an embodiment of the present application.

As shown in FIG. 20, if the rising edge of the pulse signal corresponding to the secondary current and the rising edge of the drive signal are synchronous, and the falling edge of the pulse signal corresponding to the secondary current and the falling edge of the drive signal are synchronous, it indicates that the resonant power converter works at the resonant frequency point. In this case, the frequency of the drive signal does not need to be adjusted, and it only requires to keep the frequency of the drive signal unchanged.

Figure 21:
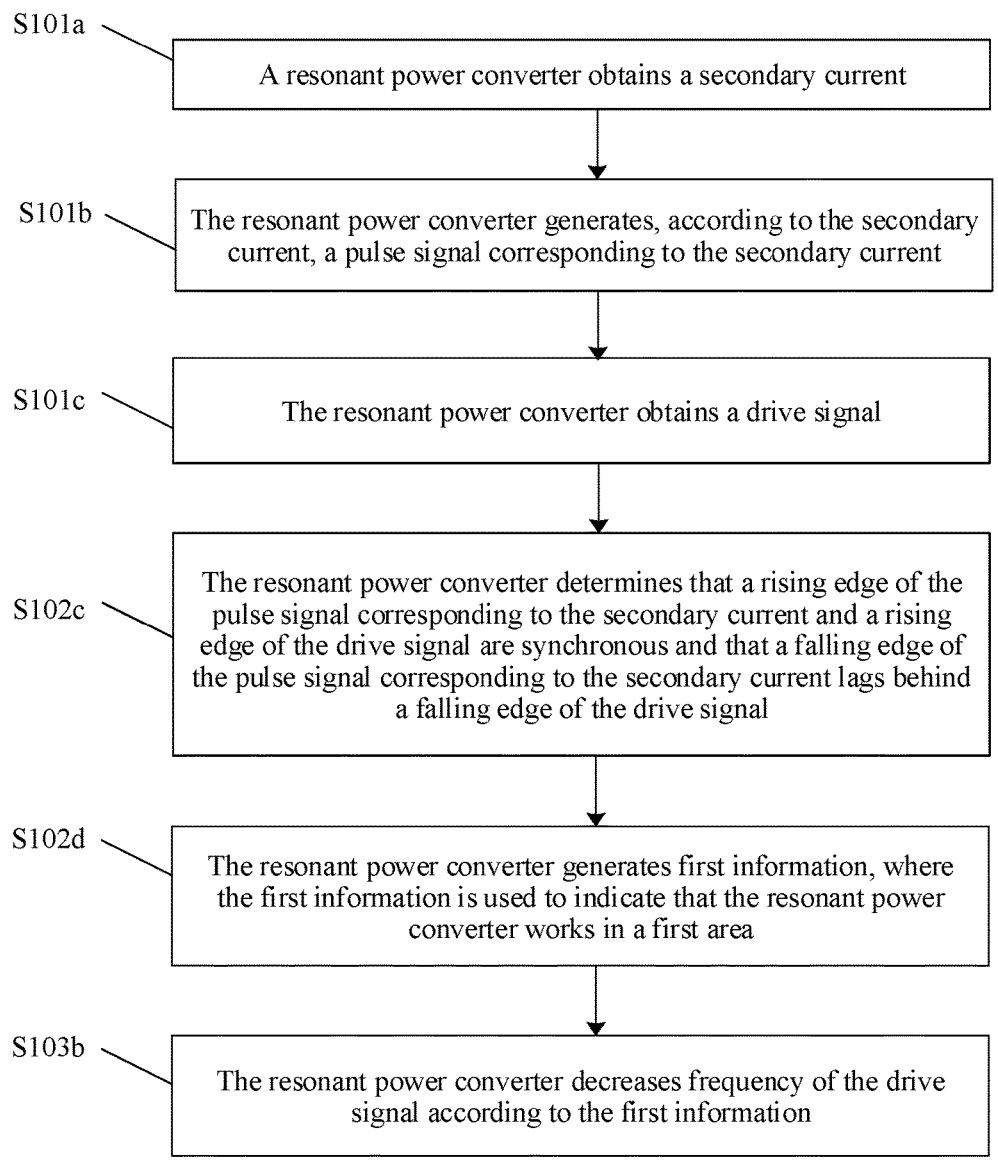
FIG. 21 is a fourth schematic flowchart of a frequency tracking method for a resonant power converter according to an embodiment of the present application.

Specifically, as shown in FIG. 21, step S102 may include S102c and S102d.

S102c. The resonant power converter determines that a rising edge of the pulse signal corresponding to the secondary current and a rising edge of the drive signal are synchronous and that a falling edge of the pulse signal corresponding to the secondary current lags behind a falling edge of the drive signal.

S102d. The resonant power converter generates the first information, where the first information is used to indicate that the resonant power converter works in a first area.

Specifically, the determining branch of the resonant power converter performs step S102c and S102d, and sends the first information to the control branch of the resonant power converter.

Correspondingly, Step S103 may include S103b.

S103b. The resonant power converter decreases the frequency of the drive signal according to the first information.

Specifically, the control branch of the resonant power converter performs step S103b, and sends the drive signal with decreased frequency to the determining branch of the resonant power converter.

Figure 22:
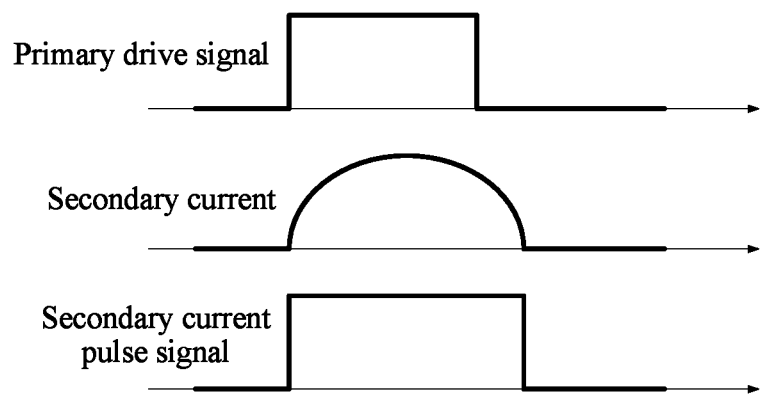
FIG. 22 is a waveform diagram when a resonant power converter works in a first area according to an embodiment of the present application.

As shown in FIG. 22, if the rising edge of the pulse signal corresponding to the secondary current and the rising edge of the drive signal are synchronous, and the falling edge of the pulse signal corresponding to the secondary current lags behind the falling edge of the drive signal, it indicates that the resonant power converter works in the first area. In this case, the frequency of the drive signal needs to be decreased, so that the resonant power converter works at the resonant frequency point.

It may be understood that the resonant power converter may gradually decrease the frequency of the drive signal, so that the resonant power converter can work at the resonant frequency point after adjustment is performed multiple times. For example, the resonant power converter decreases the frequency of the drive signal by a preset value each time, and then performs determining. The frequency of the drive signal of the resonant power converter is adjusted multiple times, so that the resonant power converter finally works at the resonant frequency point.

Figure 23:
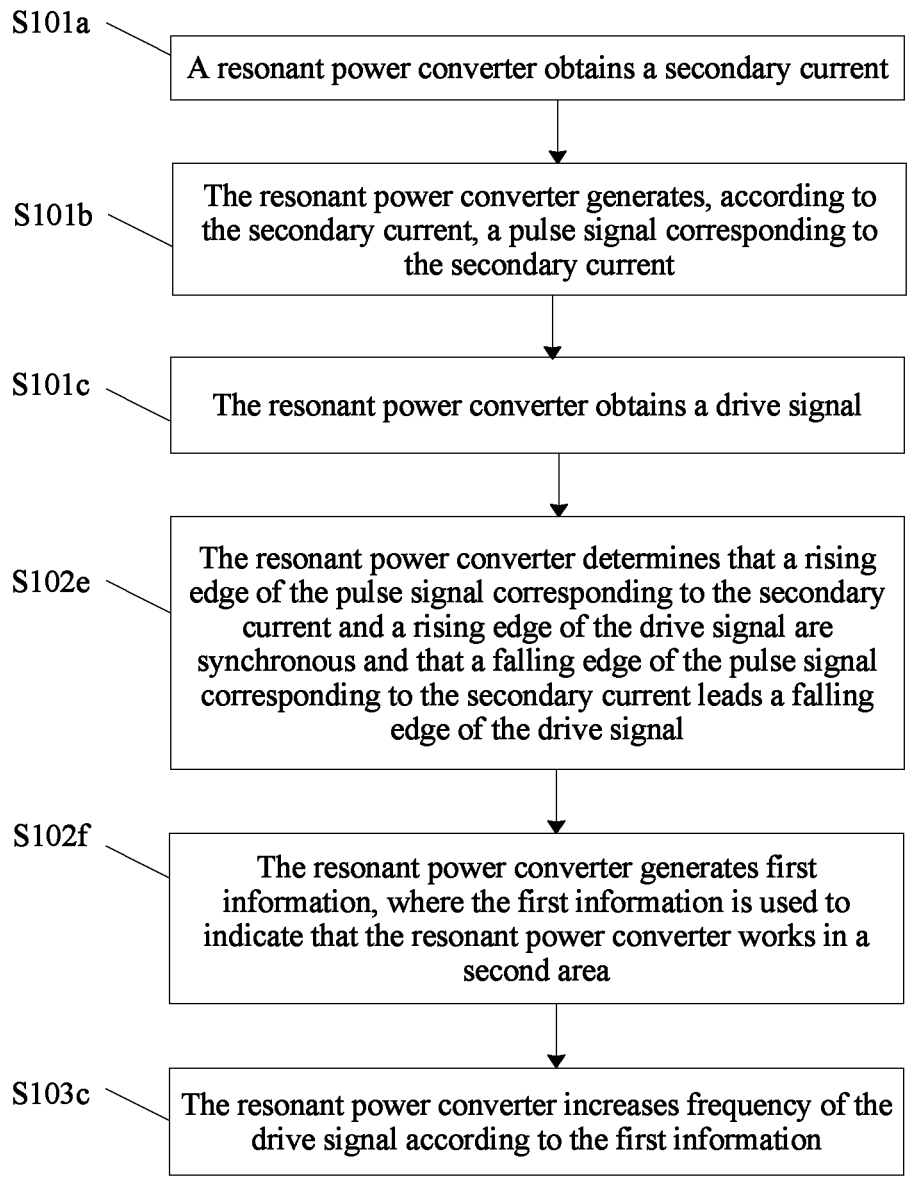
FIG. 23 is a fifth schematic flowchart of a frequency tracking method for a resonant power converter according to an embodiment of the present application.

Specifically, as shown in FIG. 23, step S102 may include S102e and S102f.

S102e. The resonant power converter determines that a rising edge of the pulse signal corresponding to the secondary current and a rising edge of the drive signal are synchronous and that a falling edge of the pulse signal corresponding to the secondary current leads a falling edge of the drive signal.

S102f. The resonant power converter generates the first information, where the first information is used to indicate that the resonant power converter works in a second area.

Specifically, the determining branch of the resonant power converter performs step S102e and S102f, and sends the first information to the control branch of the resonant power converter.

Correspondingly, Step S103 may include S103c.

S103c. The resonant power converter increases the frequency of the drive signal according to the first information.

Specifically, the control branch of the resonant power converter performs step S103c, and sends the drive signal with increased frequency to the determining branch of the resonant power converter.

Figure 24:
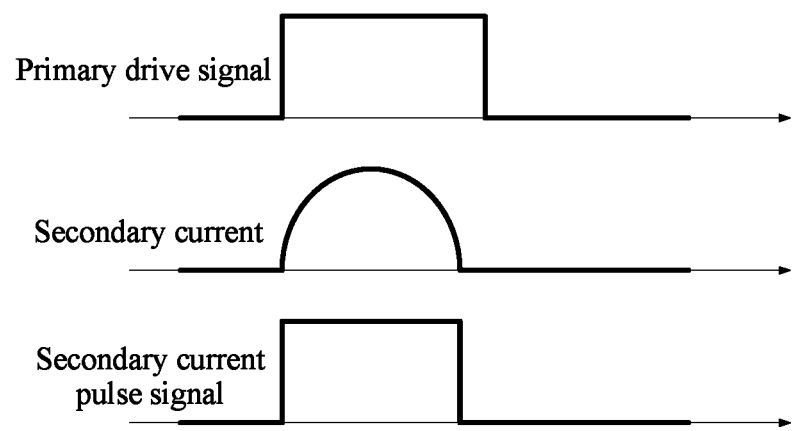
FIG. 24 is a waveform diagram when a resonant power converter works in a second area according to an embodiment of the present application.

As shown in FIG. 24, if the rising edge of the pulse signal corresponding to the secondary current and the rising edge of the drive signal are synchronous, and the falling edge of the pulse signal corresponding to the secondary current leads the falling edge of the drive signal, it indicates that the resonant power converter works in the second area. In this case, the frequency of the drive signal needs to be increased, so that the resonant power converter works at the resonant frequency point.

Similarly, the resonant power converter may gradually increase the frequency of the drive signal, so that the resonant power converter can work at the resonant frequency point after adjustment is performed multiple times.

Figure 25:
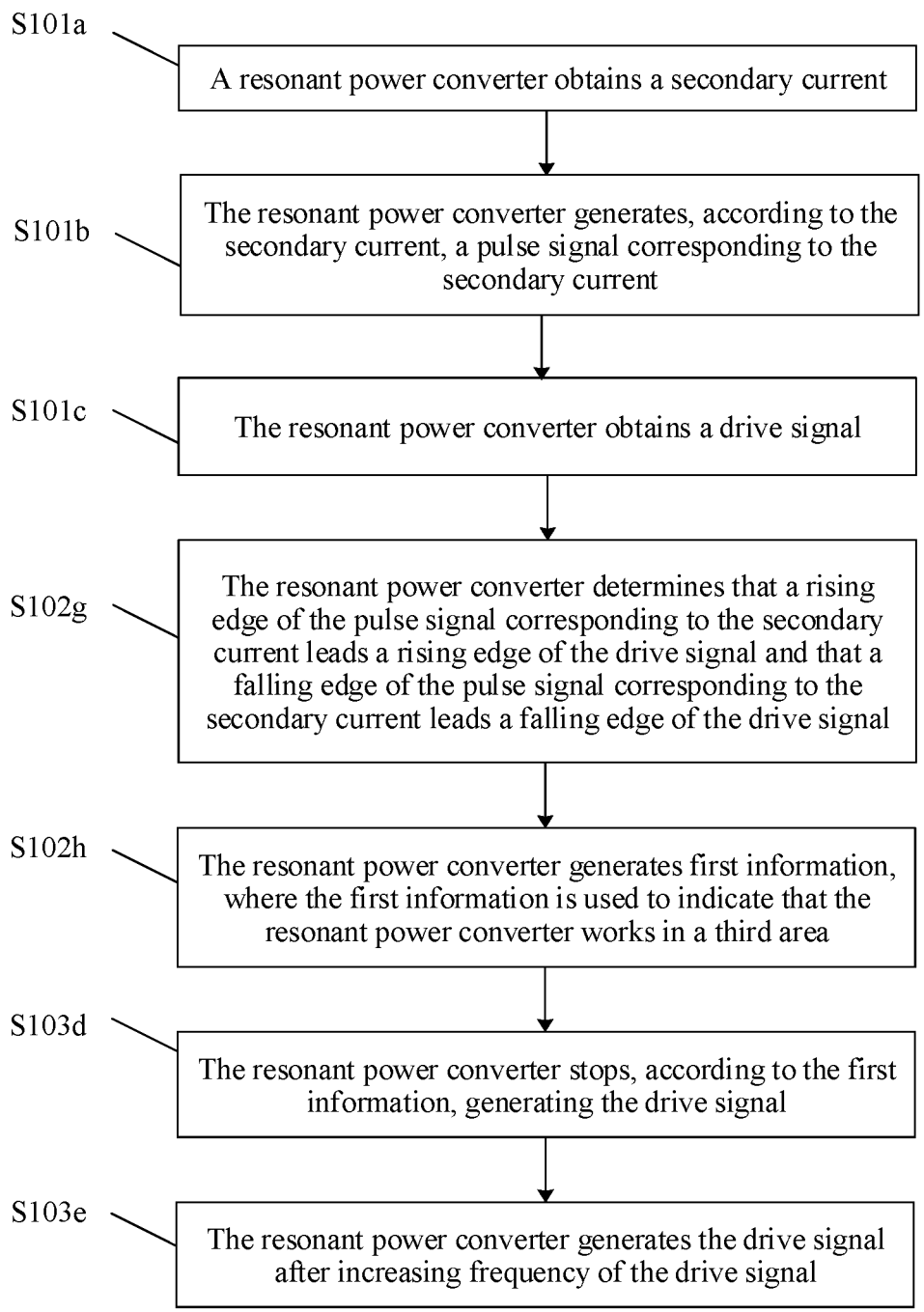
FIG. 25 is a sixth schematic flowchart of a frequency tracking method for a resonant power converter according to an embodiment of the present application.

Specifically, as shown in FIG. 25, step S102 may include S102g and S102h.

S102g. The resonant power converter determines that a rising edge of the pulse signal corresponding to the secondary current leads a rising edge of the drive signal and that a falling edge of the pulse signal corresponding to the secondary current leads a falling edge of the drive signal.

S102h. The resonant power converter generates the first information, where the first information is used to indicate that the resonant power converter works in a third area.

Specifically, the determining branch of the resonant power converter performs step S102g and S102h, and sends the first information to the control branch of the resonant power converter.

Correspondingly, Step S103 may include S103d and S103e.

S103d. The resonant power converter stops, according to the first information, generating the drive signal.

S103e. The resonant power converter generates the drive signal after increasing the frequency of the drive signal.

Specifically, the control branch of the resonant power converter performs step S103d and S103e, and sends the drive signal with increased frequency to the determining branch of the resonant power converter.

Figure 26:
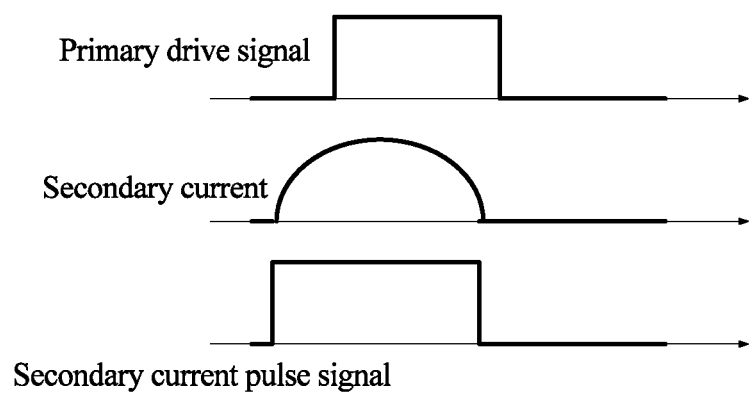
FIG. 26 is a waveform diagram when a resonant power converter works in a third area according to an embodiment of the present application.

As shown in FIG. 26, if the rising edge of the pulse signal corresponding to the secondary current leads the rising edge of the drive signal, and the falling edge of the pulse signal corresponding to the secondary current leads the falling edge of the drive signal, it indicates that the resonant power converter works in the third area. In this case, to avoid breakdown, generation of the drive signal needs to be stopped first, and after the control branch of the resonant power converter increases the frequency of the drive signal, the control branch of the resonant power converter resumes the generation of the drive signal and sends the drive signal to the inverter branch of the resonant power converter. Then, it is determined whether the resonant power converter still works in the third area, and if the resonant power converter still works in the third area, the generation of the drive signal is stopped again, and the frequency of the drive signal is further increased, so that the resonant power converter finally works at the resonant frequency point.

It should be noted that a relationship between the rising edge of the pulse signal corresponding to the secondary current and the rising edge of the drive signal and a relationship between the falling edge of the pulse signal corresponding to the secondary current and the falling edge of the drive signal may be determined by using two methods. In a first method, the relationships are determined by using a logical operation. In a second method, the relationships are determined by comparing sizes of data that is in a register and that represents rising edges of two pulse signals and comparing sizes of data that is in the register and that represents falling edges of the two pulse signals, that is, a time difference between two sizes is determined.

For example, in the first method, it is assumed that A represents the drive signal and B represents the pulse signal corresponding to the secondary current, and the method for performing determining by using a logical operation is: If a result of A and B is equal to both A and B, A and B are the same, and it indicates that the resonant power converter works at the resonant frequency point; if a result of A and B is equal to A and unequal to B, it indicates that the converter works in an area 1; if a result of A and B is equal to B and unequal to A, it indicates that the converter works in an area 2; or if a result of A and B is unequal to neither A nor B, it indicates that the converter works in an area 3.

For example, in the second method, a manner in which the sizes of the data that is in the register and that represents the rising edges and the falling edges of the two pulse signals are compared is: A drive signal of a switching transistor in a DSP (digital signal processor) is generated by comparing a timing register and a comparison register, the timing register starts counting when each interruption period starts, and data in the timing resister is maximum when the interruption period ends; when a next interruption period starts, the timing register is reset to count again; and when a value in a PWM (pulse width modulation) comparison register is equal to a value in the timing register, a PWM signal jumps, and at this time, a value in the timing register when the signal jumps is recorded. The pulse signal corresponding to the secondary current is sent to the DSP by using an AD interface. A corresponding value in the timing register when a pulse jumps is recorded in each interruption period by using a same method, so as to compare a difference between a value in a corresponding register when the drive signal jumps (including rising jumping and falling jumping) and a value in the timing register when the pulse signal corresponding to the secondary current jumps (including rising jumping and falling jumping). If both a difference between two values during the rising jumping and a difference between two values during the falling jump are less than a preset value (the preset value is related to a value such as clock frequency and resolution and is defined by a designer), it indicates that the two signals have synchronous rising edges and synchronous falling edges. If the difference between the values in the two registers during the rising jumping is less than the preset value, and during the falling jumping, the value in the register corresponding to the drive signal is less than the value in the register corresponding to the pulse signal, it indicates that the resonant power converter works in the area 1. If the difference between the values in the two timing registers during the rising jumping is less than the preset value, and during the falling jumping, the value in the timing register corresponding to the drive signal is greater than the value in the timing register corresponding to the pulse signal, it indicates that the resonant power converter works in the area 2. When if both the value in the register corresponding to the drive signal during the rising jumping and the value in the register corresponding to the drive signal during the falling jumping are greater than the value in the register corresponding to the pulse signal, it indicates that the resonant power converter works in the area 3.

This embodiment of the present application provides the frequency tracking method for a resonant power converter. The frequency tracking method is applied to the resonant power converter. The frequency tracking method for a resonant power converter includes: obtaining the pulse signal corresponding to the secondary current and the drive signal; generating the first information according to the pulse signal corresponding to the secondary current and the drive signal, where the first information is used to indicate the resonant status of the resonant power converter; and controlling the frequency of the drive signal according to the first information. Based on the foregoing descriptions, the determining branch can receive the pulse signal that is corresponding to the secondary current and sent by the detection branch, and generate, according to the pulse signal corresponding to the secondary current and the drive signal, the first information that is used to indicate the resonant status of the resonant power converter, so that the control branch controls the frequency of the drive signal according to the first information. Therefore, the resonant status of the resonant power converter is determined by sampling the secondary current, and the frequency of the drive signal is controlled to track the resonant frequency of the resonant power converter.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims

What is claimed is:

1. A resonant power converter, comprising:
   an inverter circuit,
   a resonant circuit connected to the inverter circuit,
   a transformer connected to the resonant circuit,
   a rectification and filtering circuit connected to the transformer,
   a detection circuit,
   a sampling circuit,
   a determining circuit, and
   a control circuit,
   wherein:
   a first side of the transformer is connected to the resonant circuit, a second side of the transformer is connected to the rectification and filtering circuit,
   the detection circuit is connected to both the second side of the transformer and the rectification and filtering circuit,
   the determining circuit is connected to the detection circuit, and
   the control circuit is connected to both the determining circuit and the inverter circuit,
   the detection circuit is configured to: obtain a secondary current of the transformer, generate, according to the secondary current, a pulse signal corresponding to the secondary current, and send the pulse signal corresponding to the secondary current to the determining circuit,
   the control circuit is configured to generate a drive signal and send the drive signal to the inverter circuit and to the determining circuit, wherein the drive signal is used to drive the inverter circuit,
   the determining circuit is configured to: receive the pulse signal that is corresponding to the secondary current and sent by the detection circuit and receive the drive signal that is sent by the control circuit, generate first information based on the pulse signal and the drive signal, and send the first information to the control circuit, wherein the first information is used to indicate a resonant status of the resonant power converter,
   the control circuit is further configured to: receive the first information sent by the determining circuit, and control frequency of the drive signal according to the first information, and
   the sampling circuit is connected to each of the detection circuit, the second side of the transformer, and the rectification and filtering circuit, wherein the sampling circuit is configured to sample the secondary current, wherein the sampling circuit comprises: a comparator, a first resistor, a second resistor, a third resistor, and a capacitor, wherein:
   an output end of the comparator is connected to one end of the third resistor,
   one end of the capacitor is connected to the other end of the third resistor,
   the other end of the third resistor is connected to the detection circuit,
   a positive input end of the comparator is connected to one end of the first resistor,
   a negative input end of the comparator is connected to one end of the second resistor,
   the other end of the first resistor is connected to both the transformer and the rectification and filtering circuit, and
   the other end of the second resistor and the other end of the capacitor are grounded.

2. The resonant power converter according to claim 1, wherein:
   the inverter circuit is of any one of a half-bridge inverter circuit structure, a full-bridge inverter circuit structure, or a three-level inverter circuit structure.

3. The resonant power converter according to claim 2, wherein:
   the resonant circuit is of a resonant circuit structure that is formed by connecting an excitation inductor, a resonant inductor, and a resonant capacitor in series.

4. The resonant power converter according to claim 3, wherein:
   the rectification and filtering circuit is of a half-wave rectification and filtering circuit structure or a full-wave rectification and filtering circuit structure.

5. The resonant power converter according to claim 2, wherein:
   the rectification and filtering circuit is of a half-wave rectification and filtering circuit structure or a full-wave rectification and filtering circuit structure.

6. The resonant power converter according to claim 1, wherein:
   the resonant circuit is of a resonant circuit structure that is formed by connecting an excitation inductor, a resonant inductor, and a resonant capacitor in series.

7. The resonant power converter according to claim 1, wherein:
   the rectification and filtering circuit is of a half-wave rectification and filtering circuit structure or a full-wave rectification and filtering circuit structure.

8. A frequency tracking method, comprising:
   obtaining, by a resonant power converter, a pulse signal corresponding to a secondary current and a drive signal;
   generating, by the resonant power converter, first information according to the pulse signal corresponding to the secondary current and the drive signal, wherein the first information indicates a resonant status of the resonant power converter; and
   controlling, by the resonant power converter, frequency of the drive signal according to the first information,
   wherein the generating the first information according to the pulse signal corresponding to the secondary current and the drive signal comprises:
   determining that a rising edge of the pulse signal corresponding to the secondary current and a rising edge of the drive signal are synchronous;
   determining that a falling edge of the pulse signal corresponding to the secondary current and a falling edge of the drive signal are synchronous; and
   generating the first information, wherein the first information indicates that the resonant power converter works at a resonant frequency point;

wherein the controlling the frequency of the drive signal according to the first information comprises keeping the frequency of the drive signal unchanged according to the first information.

9. The frequency tracking method according to claim 8, wherein the obtaining the pulse signal corresponding to the secondary current comprises:
   obtaining the secondary current; and
   generating, according to the secondary current, the pulse signal corresponding to the secondary current.

10. A frequency tracking method, comprising:
    obtaining, by a resonant power converter, a pulse signal corresponding to a secondary current and a drive signal;
    generating, by the resonant power converter, first information according to the pulse signal corresponding to the secondary current and the drive signal, wherein the first information indicates a resonant status of the resonant power converter; and
    controlling, by the resonant power converter, frequency of the drive signal according to the first information,
    wherein the generating the first information according to the pulse signal corresponding to the secondary current and the drive signal comprises:
       determining that a rising edge of the pulse signal corresponding to the secondary current and a rising edge of the drive signal are synchronous;
       determining that a falling edge of the pulse signal corresponding to the secondary current lags behind a falling edge of the drive signal; and
       generating the first information, wherein the first information indicates that the resonant power converter works in a first area;
    wherein the controlling the frequency of the drive signal according to the first information comprises decreasing the frequency of the drive signal according to the first information.

11. The frequency tracking method according to claim 10, wherein the obtaining the pulse signal corresponding to the secondary current comprises:
    obtaining the secondary current; and
    generating, according to the secondary current, the pulse signal corresponding to the secondary current.

12. A frequency tracking method, comprising:
    obtaining, by a resonant power converter, a pulse signal corresponding to a secondary current and a drive signal;
    generating, by the resonant power converter, first information according to the pulse signal corresponding to the secondary current and the drive signal, wherein the first information indicates a resonant status of the resonant power converter; and
    controlling, by the resonant power converter, frequency of the drive signal according to the first information,
    wherein the generating the first information according to the pulse signal corresponding to the secondary current and the drive signal comprises:
       determining that a rising edge of the pulse signal corresponding to the secondary current and a rising edge of the drive signal are synchronous;
       determining that a falling edge of the pulse signal corresponding to the secondary current leads a falling edge of the drive signal; and
       generating the first information, wherein the first information indicates that the resonant power converter works in a second area;
    wherein the controlling the frequency of the drive signal according to the first information comprises increasing the frequency of the drive signal according to the first information.

13. The frequency tracking method according to claim 12, wherein the obtaining the pulse signal corresponding to the secondary current comprises:
    obtaining the secondary current; and
    generating, according to the secondary current, the pulse signal corresponding to the secondary current.

14. A frequency tracking method, comprising:
    obtaining, by a resonant power converter, a pulse signal corresponding to a secondary current and a drive signal;
    generating, by the resonant power converter, first information according to the pulse signal corresponding to the secondary current and the drive signal, wherein the first information indicates a resonant status of the resonant power converter; and
    controlling, by the resonant power converter, frequency of the drive signal according to the first information,
    wherein the generating the first information according to the pulse signal corresponding to the secondary current and the drive signal comprises:
       determining that a rising edge of the pulse signal corresponding to the secondary current leads a rising edge of the drive signal;
       determining that a falling edge of the pulse signal corresponding to the secondary current leads a falling edge of the drive signal; and
       generating the first information, wherein the first information indicates that the resonant power converter works in a third area;
    wherein the controlling the frequency of the drive signal according to the first information comprises:
       stopping, according to the first information, generating the drive signal; and
       after the stopping, generating the drive signal after increasing the frequency of the drive signal.

15. The frequency tracking method according to claim 14, wherein the obtaining the pulse signal corresponding to the secondary current comprises:
    obtaining the secondary current; and
    generating, according to the secondary current, the pulse signal corresponding to the secondary current.

* * * * *